(12) United States Patent
Benny et al.

(10) Patent No.: US 12,744,977 B2
(45) Date of Patent: Sep. 22, 2026

(54) REAL-TIME MULTI-SPECTRAL SYSTEM AND METHOD

(71) Applicant: ELBIT SYSTEMS ELECTRO-OPTICS—ELOP LTD., Rehovot (IL)

(72) Inventors: Eliyahu Benny, Rehovot (IL); Uriel Ankor, Rehovot (IL); Michael Gilichinsky, Rehovot (IL)

(73) Assignee: ELBIT SYSTEMS ELECTRO-OPTICS—ELOP LTD., Rehovot (IL)

( * ) Notice: Subject to any disclaimer, the term of this patent is extended or adjusted under 35 U.S.C. 154(b) by 0 days.

(21) Appl. No.: 19/169,041

(22) Filed: Apr. 3, 2025

(65) Prior Publication Data

US 2025/0274643 A1 Aug. 28, 2025

Related U.S. Application Data

(63) Continuation of application No. PCT/IL2023/051058, filed on Oct. 3, 2023.

(30) Foreign Application Priority Data

Oct. 6, 2022 (IL) .......................................... 297350
Sep. 19, 2023 (IL) .......................................... 306085

(51) Int. Cl.
*H04N 23/11* (2023.01)
*G06V 10/58* (2022.01)
(Continued)

(52) U.S. Cl.
CPC ............. *H04N 23/11* (2023.01); *G06V 10/58* (2022.01); *G06V 10/70* (2022.01); *G06V 20/10* (2022.01);
(Continued)

(58) Field of Classification Search
CPC ........ H04N 23/11; H04N 23/73; H04N 23/12; H04N 17/00; G06V 10/70; G06V 10/58; G06V 20/10; G06V 2201/07
(Continued)

(56) References Cited

U.S. PATENT DOCUMENTS 5,324,113 A 6/1994 Ingram, Jr. et al.
6,484,099 B1 11/2002 Holzer-Popp et al.
(Continued)

FOREIGN PATENT DOCUMENTS

CN 104112278 A 10/2014
CN 106557784 A 4/2017
(Continued)

OTHER PUBLICATIONS

Runnels, Denise Renee—A Novel Methodology for Calculating Large Numbers of Symmetrical Matrices on a Graphics Processing Unit: Towards Efficient, Real-Time Hyperspectral Image Processing. The University of Southern Mississippi, 2013.
(Continued)

*Primary Examiner* — Matthew David Kim
(74) *Attorney, Agent, or Firm* — S.J. INTELLECTUAL PROPERTY LTD.

(57) ABSTRACT

A system for detecting one or more target materials in an un-calibrated multi-spectral data cube comprising a collection of pixels, the system comprising a processing circuitry configured to: obtain: (A) a machine learning model capable of receiving the un-calibrated multi-spectral data cube and determining for at least one pixel of the pixels at least one material indicator, indicative of existence of a given target material of the target materials at the location of the pixel, wherein the machine learning model is trained utilizing a labeled training-data set comprising of a plurality of training records, each training record comprising: (i) a training
(Continued)

un-calibrated multi-spectral data cube, and (ii) at least one training material indicator associated with at least one pixel of the training un-calibrated multi-spectral data cube, indicative of existence of the target material at the location of the pixel, and (B) the un-calibrated multi-spectral data cube; and determine for at least one pixel of the pixels of the un-calibrated multi-spectral data cube, at least one material indicator, and a corresponding calibrated multi-spectral data cube, wherein the corresponding calibrated multi-spectral data cube is calculated by utilizing a calibration process and an atmospheric simulator that simulates a plurality of simulated un-calibrated multi-spectral data cubes by simulation of different atmospheric conditions over the calibrated multi-spectral cube.

3 Claims, 16 Drawing Sheets

(51) Int. Cl.
*G06V 10/70* (2022.01)
*G06V 20/10* (2022.01)
*H04N 23/12* (2023.01)
*H04N 23/73* (2023.01)
*H04N 17/00* (2006.01)

(52) U.S. Cl.
CPC ............ *H04N 23/12* (2023.01); *H04N 23/73* (2023.01); *G06V 2201/07* (2022.01); *H04N 17/00* (2013.01)

(58) Field of Classification Search
USPC .......................................................... 348/164
See application file for complete search history.

(56) References Cited

U.S. PATENT DOCUMENTS

| | | | |
|---|---|---|---|
| 10,641,658 B1 * | 5/2020 | Yu | G06T 7/557 |
| 10,713,536 B1 * | 7/2020 | Ke | A01M 31/002 |
| 11,250,260 B2 | 2/2022 | Bader et al. | |
| 2005/0180651 A1 | 8/2005 | Bernstein et al. | |
| 2006/0054780 A1 | 3/2006 | Garrood et al. | |
| 2008/0046217 A1 * | 2/2008 | Polonskiy | G01J 3/28 702/179 |
| 2011/0071675 A1 | 3/2011 | Wells et al. | |
| 2012/0035884 A1 * | 2/2012 | Ingram | G06F 17/18 702/181 |
| 2012/0249819 A1 | 10/2012 | Imai | |
| 2013/0293702 A1 | 11/2013 | Xin et al. | |
| 2014/0019166 A1 | 1/2014 | Swanson et al. | |
| 2014/0253735 A1 | 9/2014 | Fox et al. | |
| 2015/0161768 A1 | 6/2015 | Ardouin | |
| 2015/0204974 A1 | 7/2015 | Pillay | |
| 2015/0219557 A1 * | 8/2015 | Skaff | B07C 5/342 702/189 |
| 2016/0155064 A1 | 6/2016 | Campbell et al. | |
| 2016/0196653 A1 | 7/2016 | Grant et al. | |
| 2016/0266247 A1 | 9/2016 | Hjelmstad | |
| 2017/0039478 A1 | 2/2017 | Campbell et al. | |
| 2017/0250751 A1 | 8/2017 | Kargieman et al. | |
| 2018/0157930 A1 | 6/2018 | Rutschman et al. | |
| 2019/0188504 A1 * | 6/2019 | Aihara | H04N 23/55 |
| 2020/0260005 A1 * | 8/2020 | Saxe | G01J 3/027 |
| 2021/0235044 A1 * | 7/2021 | Ietomi | H04N 23/661 |
| 2021/0239606 A1 | 8/2021 | Gabrieli | |
| 2021/0241014 A1 | 8/2021 | Choiniere | |
| 2021/0397810 A1 | 12/2021 | Landry et al. | |
| 2022/0034717 A1 | 2/2022 | Murphy et al. | |
| 2022/0191395 A1 | 6/2022 | Liu et al. | |
| 2022/0222858 A1 * | 7/2022 | Almog | H04N 19/182 |
| 2022/0232175 A1 * | 7/2022 | Yoon | G01J 3/0229 |
| 2022/0236187 A1 * | 7/2022 | Bruns | G01N 21/6456 |
| 2022/0277470 A1 * | 9/2022 | Xiao | G06T 7/10 |
| 2022/0309288 A1 | 9/2022 | Uljanovs et al. | |
| 2023/0336846 A1 * | 10/2023 | Borg | G01J 5/0802 |
| 2024/0046484 A1 * | 2/2024 | Mahajan | G01S 17/89 |
| 2024/0054248 A1 * | 2/2024 | Dille | G06F 21/6254 |
| 2024/0264454 A1 * | 8/2024 | Moggridge | G01J 3/12 |

FOREIGN PATENT DOCUMENTS

| | | | |
|---|---|---|---|
| CN | 107451616 | A | 12/2017 |
| CN | 109492700 | A | 3/2019 |
| CN | 110070004 | A | 7/2019 |
| CN | 110210292 | A | 9/2019 |
| CN | 110243769 | A | 9/2019 |
| CN | 110674724 | A | 1/2020 |
| CN | 110954487 | A | 4/2020 |
| CN | 111814564 | A | 10/2020 |
| CN | 212059103 | U | 12/2020 |
| CN | 112364859 | A | 2/2021 |
| DE | 4102579 | A1 | 8/1991 |
| DE | 102007006644 | A1 | 8/2007 |
| EP | 2405258 | A2 | 1/2012 |
| JP | 5327419 | B2 | 10/2013 |
| WO | 2005057129 | A1 | 6/2005 |
| WO | 2011155888 | A1 | 12/2011 |
| WO | 2014153603 | A1 | 10/2014 |

OTHER PUBLICATIONS

Lee, Sang Rok—A Coarse-To-Fine Approach for Remote-Sensing Image Registration Based On a Local Method. International Journal on Smart Sensing and Intelligent Systems, Dec. 2010, vol. 3. No. 4.
Lin, Hui, et al.—Image Registration Based On Corner Detection and Affine Transformation. In: 2010 3rd International Congress on Image and Signal Processing. IEEE, 2010. p. 2184-2188.
Mahdi, Hani; Farag, Aly A.—Image Registration in Multispectral Data Sets. In: Proceedings. International Conference on Image Processing. IEEE, 2002. p. II-II.
Fonseca, Leila MG; Costa, Max HM.—Automatic Registration of Satellite Images. In: Proceedings X Brazilian Symposium on Computer Graphics and Image Processing. IEEE, 1997. p. 219-226.
Okyay, Unal; Khan, Shuhab D.—Spatial Co-Registration and Spectral Concatenation of Panoramic Ground-Based Hyperspectral Images. Photogrammetric Engineering & Remote Sensing, 2018, 84.12: 781-790.
Geipel, Jakob, et al.—A Programmable Aerial Multispectral Camera System for In-Season Crop Biomass and Nitrogen Content Estimation. Agriculture, 2016, 6.1: 4.
Mitsunaga, Tomoo; Nayar, Shree K.—Radiometric Self Calibration. In: Proceedings. 1999 IEEE computer society conference on computer vision and pattern recognition (Cat. No. PR00149). IEEE, 1999. p. 374-380.
Zhu, Sijie; Lei, Bin; Wu, Yirong.—Retrieval of Hyperspectral Surface Reflectance Based On Machine Learning. Remote Sensing, 2018, 10.2: 323.
Geladi, Paul, Jim Burger, and Torbjorn Lestander. "Hyperspectral Imaging: Calibration Problems and Solutions." Chemometrics and intelligent laboratory systems 72.2 (2004): 209-217. Geladi, Paul, Jim Burger, and Torbjorn Lestander Apr. 12, 2004 (Apr. 12, 2004).
Sohaib, Ahmed, and Antonio Robles-Kelly. "Exposure Time Calculation for Spectral Cameras." Journal of Electronic Imaging 24.5 (2015): 053025-053025. Sohaib, Ahmed, and Antonio Robles-Kelly Oct. 13, 2015 (Oct. 13, 2015).
Basener, Bill, and Abigail Basener. "Gaussian Process and Deep Learning Atmospheric Correction." Remote Sensing 15.3 (2023): 649. Basener, Bill, and Abigail Basener Jan. 21, 2023 (Jan. 21, 2023).
Breaking Defense, "Raiven: Sensing at the edge and beyond the pixel with embedded hyperspectral imaging and artificial intelligence", in Breaking Defense, Apr. 26, 2023—https://breakingdefense.com/2023/04/raiven-sensing-at-the-edge-and-beyond-the-pixel-with-embedded-hyperspectral-imaging-and-artificial-intelligence/.

(56) References Cited

OTHER PUBLICATIONS

Ji, Jingyu, et al. Infrared and visible image registration based on automatic robust algorithm. Electronics, 2022, 11.11:1674. https://doi.org/10.3390/electronics11111674.

Wang, Sheng et al., "Unmanned Aerial System multispectral mapping for low and variable solar irradiance conditions: Potential of tensor decomposition", ISPRS Journal of Photogrammetry and Remote Sensing, Amsterdam [U.A.] : Elsevier, Amsterdam, NL, vol. 155, Jul. 4, 2019 (Jul. 4, 2019), pp. 58-71, XP085752673, ISSN: 0924-2716, DOI: 10.1016/J.ISPRSJPRS.2019.06.017.

* cited by examiner

Figure 9:
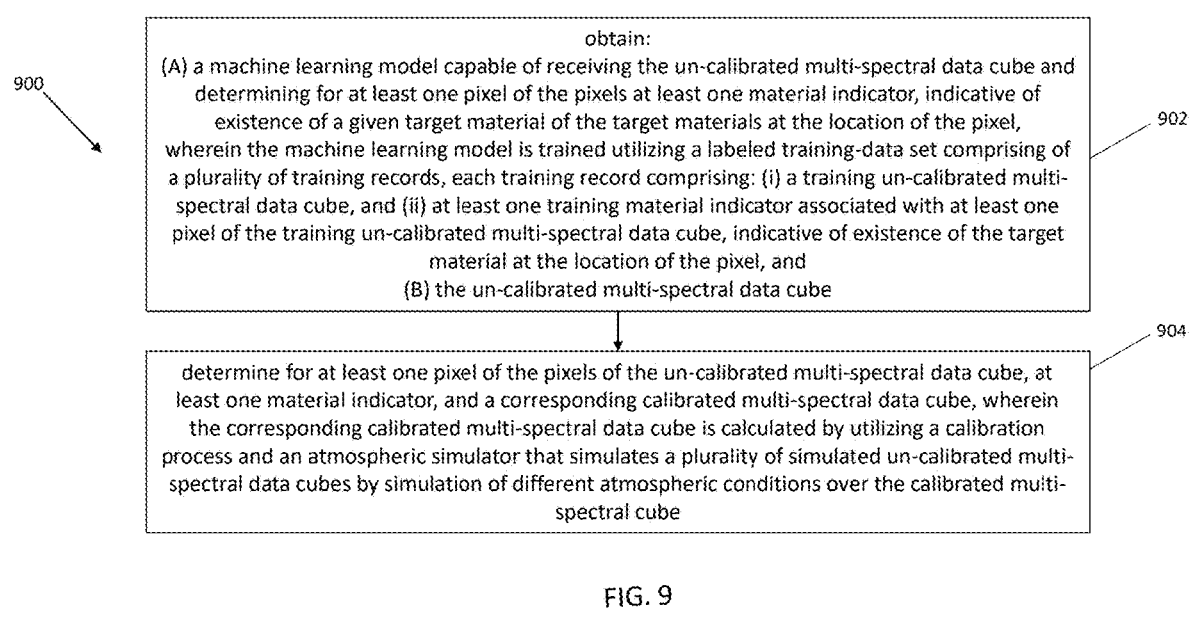

900 obtain:
(A) a machine learning model capable of receiving the un-calibrated multi-spectral data cube and determining for at least one pixel of the pixels at least one material indicator, indicative of existence of a given target material of the target materials at the location of the pixel, wherein the machine learning model is trained utilizing a labeled training-data set comprising of a plurality of training records, each training record comprising: (i) a training un-calibrated multi-spectral data cube, and (ii) at least one training material indicator associated with at least one pixel of the training un-calibrated multi-spectral data cube, indicative of existence of the target material at the location of the pixel, and
(B) the un-calibrated multi-spectral data cube

902 determine for at least one pixel of the pixels of the un-calibrated multi-spectral data cube, at least one material indicator, and a corresponding calibrated multi-spectral data cube, wherein the corresponding calibrated multi-spectral data cube is calculated by utilizing a calibration process and an atmospheric simulator that simulates a plurality of simulated un-calibrated multi-spectral data cubes by simulation of different atmospheric conditions over the calibrated multi-spectral cube

Figure 11:
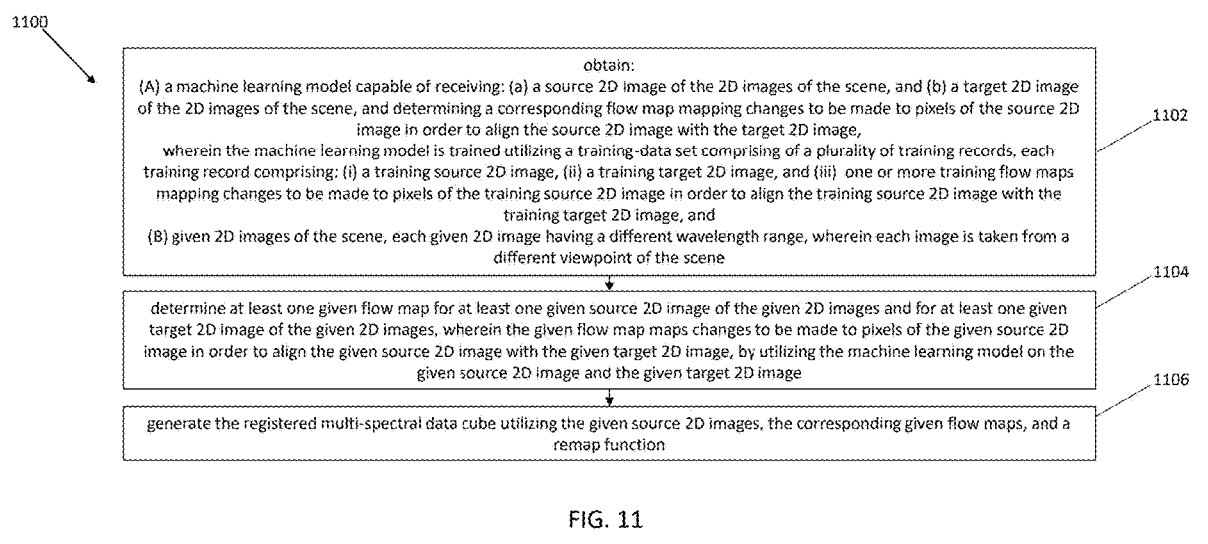

1100 obtain:
(A) a machine learning model capable of receiving: (a) a source 2D image of the 2D images of the scene, and (b) a target 2D image of the 2D images of the scene, and determining a corresponding flow map mapping changes to be made to pixels of the source 2D image in order to align the source 2D image with the target 2D image,
wherein the machine learning model is trained utilizing a training-data set comprising of a plurality of training records, each training record comprising: (i) a training source 2D image, (ii) a training target 2D image, and (iii) one or more training flow maps mapping changes to be made to pixels of the training source 2D image in order to align the training source 2D image with the training target 2D image, and
(B) given 2D images of the scene, each given 2D image having a different wavelength range, wherein each image is taken from a different viewpoint of the scene

1102 determine at least one given flow map for at least one given source 2D image of the given 2D images and for at least one given target 2D image of the given 2D images, wherein the given flow map maps changes to be made to pixels of the given source 2D image in order to align the given source 2D image with the given target 2D image, by utilizing the machine learning model on the given source 2D image and the given target 2D image

1104 generate the registered multi-spectral data cube utilizing the given source 2D images, the corresponding given flow maps, and a remap function

REAL-TIME MULTI-SPECTRAL SYSTEM AND METHOD

TECHNICAL FIELD

The present invention relates to the field of a real-time multi-spectral and/or hyperspectral system and method.

BACKGROUND

Multi-spectral target detection systems use multiple image acquisition channels to acquire a scene, each of the imaging channels has a unique wavelength. These systems obtain one or more target spectral signatures to be detected within the scene. Multi-spectral target detection systems can be used in the fields of biomedical engineering, agriculture, weather forecasting, space exploration, homeland security, military operations and more.

Current multi-spectral target detection solutions are unable to achieve remote sensing of a scene by applying an on-the-fly atmospheric correction on the captured multispectral imaging data and are unable to detect targets within the scene in at least near real-time speed. These current solutions require offline atmospheric correction and analysis of the captured multispectral imaging data, usually performed by human analysts which takes significant time.

In addition, current multi-spectral target detection solutions do not take advantage of Machine Learning (ML) and/or Artificial Intelligence (AI) technologies that can be used to automate at least part of the target detection process by relying on trained AI and/or ML models in one or more aspects of the multi-spectral target detection process.

Thus, there is a need in the art for a new real-time multi-spectral system and method.

GENERAL DESCRIPTION

In accordance with a first aspect of the presently disclosed subject matter, there is provided a multi-spectral potential target identification system, the system comprising: a multi-spectral sensor capable of acquiring images in a plurality of imaging channels, each having a different wavelength range; one or more additional sensors; and a processing circuitry configured to: obtain one or more target spectral signatures; activate the multi-spectral sensor, wherein the multi-spectral sensor is initiated to operate in a wide Short Wave Infra-Red (SWIR) simple mode; determine, based on viewing a first Field Of View (FOV) by the multi-spectral sensor in the wide SWIR simple mode, calculated exposure times for each imaging channel of the plurality of imaging channels of the multi-spectral sensor; determine, based on an input from a user, atmospheric calibration matrix for the multi-spectral sensor; generate a multi-spectral data cube of a second FOV viewed by the multi-spectral sensor, utilizing the multi-spectral sensor, the calculated exposure times and the atmospheric correction matrix, wherein the generation of the multi-spectral data cube includes radiometric calibration and multi-channel registration; identify, utilizing the multi-spectral data cube, one or more potential targets, wherein each target is group of pixels identified within the multi-spectral data cube with a spectral signature that corresponds to at least one of the obtained target spectral signatures and wherein each target has a geolocation; and investigate one or more of the identified potential targets utilizing the one or more additional sensors.

In accordance with a second aspect of the presently disclosed subject matter, there is provided a multi-spectral potential target identification method, the method comprising: obtaining, by a processing circuitry, one or more target spectral signatures; activating, by the processing circuitry, a multi-spectral sensor, capable of acquiring images in a plurality of imaging channels, each having a different wavelength range, wherein the multi-spectral sensor is initiated to operate in a wide Short Wave Infra-Red (SWIR) simple mode; determining, by the processing circuitry, based on viewing a first Field Of View (FOV) by the multi-spectral sensor in the wide SWIR simple mode, calculated exposure times for each imaging channel of the plurality of imaging channels of the multi-spectral sensor; determining, by the processing circuitry, based on an input from a user, atmospheric calibration matrix for the multi-spectral sensor; generating, by the processing circuitry, a multi-spectral data cube of a second FOV viewed by the multi-spectral sensor, utilizing the multi-spectral sensor, the calculated exposure times and the atmospheric correction matrix, wherein the generation of the multi-spectral data cube includes radiometric calibration and multi-channel registration; identifying, by the processing circuitry, utilizing the multi-spectral data cube, one or more potential targets, wherein each target is group of pixels identified within the multi-spectral data cube with a spectral signature that corresponds to at least one of the obtained target spectral signatures and wherein each target has a geolocation; and investigating, by the processing circuitry, one or more of the identified potential targets utilizing one or more additional sensors.

In accordance with a third aspect of the presently disclosed subject matter, there is provided a non-transitory computer readable storage medium having computer readable program code embodied therewith, the computer readable program code, executable by at least one processing circuitry of a computer to perform a method comprising: obtaining, by a processing circuitry, one or more target spectral signatures; activating, by the processing circuitry, a multi-spectral sensor, capable of acquiring images in a plurality of imaging channels, each having a different wavelength range, wherein the multi-spectral sensor is initiated to operate in a wide Short Wave Infra-Red (SWIR) simple mode; determining, by the processing circuitry, based on viewing a first Field Of View (FOV) by the multi-spectral sensor in the wide SWIR simple mode, calculated exposure times for each imaging channel of the plurality of imaging channels of the multi-spectral sensor; determining, by the processing circuitry, based on an input from a user, atmospheric calibration matrix for the multi-spectral sensor; generating, by the processing circuitry, a multi-spectral data cube of a second FOV viewed by the multi-spectral sensor, utilizing the multi-spectral sensor, the calculated exposure times and the atmospheric correction matrix, wherein the generation of the multi-spectral data cube includes radiometric calibration and multi-channel registration; identifying, by the processing circuitry, utilizing the multi-spectral data cube, one or more potential targets, wherein each target is group of pixels identified within the multi-spectral data cube with a spectral signature that corresponds to at least one of the obtained target spectral signatures and wherein each target has a geolocation; and investigating, by the processing circuitry, one or more of the identified potential targets utilizing one or more additional sensors.

In accordance with a fourth aspect of the presently disclosed subject matter, there is provided a system for automatically generating a calibrated multi-spectral data cube from an un-calibrated multi-spectral data cube, wherein the calibrated multi-spectral data cube is generatable from the un-calibrated multi-spectral data cube by a calibration process, the system comprising a processing circuitry configured to: obtain: (A) a machine learning model capable of receiving the un-calibrated multi-spectral data cube and generating the corresponding calibrated multi-spectral data cube, wherein the machine learning model is trained utilizing a labeled training-data set comprising of a plurality of training records, each training record comprising: (i) a training un-calibrated multi-spectral data cube, and (ii) a training calibrated multi-spectral data cube corresponding to the training un-calibrated multi-spectral data cube, and (B) the un-calibrated multi-spectral data cube; and generate the calibrated multi-spectral data cube utilizing the machine learning model and the un-calibrated multi-spectral data cube.

In some cases, at least one training record of the training records is generated utilizing an atmospheric simulator, the atmospheric simulator capable of receiving: (i) a calibrated multi-spectral data cube, and (ii) one or more atmospheric conditions, and generating an un-calibrated multi-spectral data cube that corresponds to the calibrated multi-spectral data cube under the atmospheric conditions.

In some cases, the two or more training records of the training records include different un-calibrated multi-spectral data cubes generated from the same calibrated multi-spectral data cube under different atmospheric conditions.

In some cases, the one or more atmospheric conditions include one or more of: moisture levels, sunlight angles, aerosol models, visibility scores, or geographic areas.

In some cases, the calibration process is an atmospheric calibration process.

In some cases, the machine learning model is one or more of: a convolutional neural network encoder-decoder model, a fully connected neural network model, a U-Net model, a U-Net++ model, a perceptrons model, an inception model, a resnet model, a Visual Geometry Group (VGG) model, an alexnet model, a densenet model, a mobilenet model or a visual transformer model.

In some cases, the machine learning model is trained utilizing a reinforcement learning method.

In some cases, the machine learning model further includes vision transformers.

In some cases, the un-calibrated multi-spectral data cube is captured by one or more multi-spectral sensors.

In accordance with a fifth aspect of the presently disclosed subject matter, there is provided a method for automatically generating a calibrated multi-spectral data cube from an un-calibrated multi-spectral data cube, wherein the calibrated multi-spectral data cube is generatable from the un-calibrated multi-spectral data cube by a calibration process, the method comprising: obtaining, by a processing circuitry, (A) a machine learning model capable of receiving the un-calibrated multi-spectral data cube and generating the corresponding calibrated multi-spectral data cube, wherein the machine learning model is trained utilizing a labeled training-data set comprising of a plurality of training records, each training record comprising: (i) a training un-calibrated multi-spectral data cube, and (ii) a training calibrated multi-spectral data cube corresponding to the training un-calibrated multi-spectral data cube, and (B) the un-calibrated multi-spectral data cube; and generating, by the processing circuitry, the calibrated multi-spectral data cube utilizing the machine learning model and the un-calibrated multi-spectral data cube.

In some cases, at least one training record of the training records is generated utilizing an atmospheric simulator, the atmospheric simulator capable of receiving: (i) a calibrated multi-spectral data cube, and (ii) one or more atmospheric conditions, and generating an un-calibrated multi-spectral data cube that corresponds to the calibrated multi-spectral data cube under the atmospheric conditions.

In some cases, the two or more training records of the training records include different un-calibrated multi-spectral data cubes generated from the same calibrated multi-spectral data cube under different atmospheric conditions.

In some cases, the one or more atmospheric conditions include one or more of: moisture levels, sunlight angles, aerosol models, visibility scores, or geographic areas.

In some cases, the calibration process is an atmospheric calibration process.

In some cases, the machine learning model is one or more of: a convolutional neural network encoder-decoder model, a fully connected neural network model, a U-Net model, a U-Net++ model, a perceptrons model, an inception model, a resnet model, a Visual Geometry Group (VGG) model, an alexnet model, a densenet model, a mobilenet model or a visual transformer model.

In some cases, the machine learning model is trained utilizing a reinforcement learning method.

In some cases, the machine learning model further includes vision transformers.

In some cases, the un-calibrated multi-spectral data cube is captured by one or more multi-spectral sensors.

In accordance with a sixth aspect of the presently disclosed subject matter, there is provided a non-transitory computer readable storage medium having computer readable program code embodied therewith, the computer readable program code, executable by at least one processing circuitry of a computer to perform a method comprising: obtaining, by a processing circuitry, (A) a machine learning model capable of receiving the un-calibrated multi-spectral data cube and generating the corresponding calibrated multi-spectral data cube, wherein the machine learning model is trained utilizing a labeled training-data set comprising of a plurality of training records, each training record comprising: (i) a training un-calibrated multi-spectral data cube, and (ii) a training calibrated multi-spectral data cube corresponding to the training un-calibrated multi-spectral data cube, and (B) the un-calibrated multi-spectral data cube; and generating, by the processing circuitry, the calibrated multi-spectral data cube utilizing the machine learning model and the un-calibrated multi-spectral data cube.

In accordance with a seventh aspect of the presently disclosed subject matter, there is provided a system for automatic generation of a multi-spectral labeled training-data set, the multi-spectral labeled training-data set comprising one or more training records, each training record comprising: (i) a training un-calibrated multi-spectral data cube, and (ii) a training calibrated multi-spectral data cube, wherein the training calibrated multi-spectral data cube is generatable from the training un-calibrated multi-spectral data cube by a calibration process, the system comprising a processing circuitry configured to: obtain: (A) a three-dimensional (3D) model of a scene, the 3D model having one or more properties and comprising a collection of pixels, wherein at least one pixel of the pixels is associated with: (a) a color, and (b) a label indicative of a material group that an element within the scene associated with the pixel is made of, (B) a material data-base comprising a list of materials, at least one material is associated with: (i) a spectral reflectance signature vector of the material, (ii) a typical color of the material, and (iii) a given material group of the material, and (C) a heuristic table comprising one or more rules, each rule defines a probability of an existence of a given material within a given scene based on the properties of the given scene; capture a two-dimensional (2D) image from the 3D model of the scene, the 2D image comprising a subset of the pixels; generate the training calibrated multi-spectral data cube of the training record by doing the following for at least one given pixel of the subset of pixels: query the material data-base for a list of possible materials, being materials having the material group of the given pixel; remove materials from the list of possible materials having a probability below a first threshold to exist in the 2D image in accordance with the rules of the heuristic table and with the properties of the 3D model, giving rise to a redacted list of possible materials; determine a matched material for the given pixel from the redacted list of possible materials based on a match between the color of the given pixel and the typical colors associated with the materials from the redacted list of possible materials; select at least part of the spectral reflectance signature vector associated with the matched material to be part of the training calibrated multi-spectral data cube at the location of the given pixel; and generate the training un-calibrated multi-spectral data cube of the training record utilizing the training calibrated multi-spectral data cube and an atmospheric simulator, the atmospheric simulator capable of receiving: (i) the training calibrated multi-spectral data cube, and (ii) one or more atmospheric conditions, and generating the training un-calibrated multi-spectral data cube that corresponds to the training calibrated multi-spectral data cube under the atmospheric conditions.

In some cases, the two or more training records of the training records include different un-calibrated multi-spectral data cubes generated from the same calibrated multi-spectral data cube under different atmospheric conditions.

In some cases, the calibration process is an atmospheric calibration process.

In some cases, the one or more properties of the 3D model include one or more of: geographical area, sunlight angles, or viewing distance.

In some cases, the one or more atmospheric conditions include one or more of: moisture levels, sunlight angles, aerosol models, visibility scores, or geographic areas.

In some cases, the processing circuitry is further configured to add target pixels to the 3D model before the capturing of the 2D image.

In some cases, the generation of the training un-calibrated multi-spectral data cube further includes adding texture to the generated training calibrated multi-spectral data cube based on texture associated with the corresponding captured 2D images.

In some cases, the generation of the training un-calibrated multi-spectral data cube further includes adding a simulated registration error.

In some cases, the generation of the training un-calibrated multi-spectral data cube further includes blurring at least one of the corresponding captured 2D images before the generation.

In some cases, the generation of the training un-calibrated multi-spectral data cube further includes adding shot noise to at least one of the corresponding captured 2D images before the generation.

In accordance with a eighth aspect of the presently disclosed subject matter, there is provided a method for automatic generation of a multi-spectral labeled training-data set, the multi-spectral labeled training-data set comprising one or more training records, each training record comprising: (i) a training un-calibrated multi-spectral data cube, and (ii) a training calibrated multi-spectral data cube, wherein the training calibrated multi-spectral data cube is generatable from the training un-calibrated multi-spectral data cube by a calibration process, the method comprising: obtaining, by a processing circuitry, (A) a three-dimensional (3D) model of a scene, the 3D model having one or more properties and comprising a collection of pixels, wherein at least one pixel of the pixels is associated with: (a) a color, and (b) a label indicative of a material group that an element within the scene associated with the pixel is made of, (B) a material data-base comprising a list of materials, at least one material is associated with: (i) a spectral reflectance signature vector of the material, (ii) a typical color of the material, and (iii) a given material group of the material, and (C) a heuristic table comprising one or more rules, each rule defines a probability of an existence of a given material within a given scene based on the properties of the given scene; capturing, by the processing circuitry, a two-dimensional (2D) image from the 3D model of the scene, the 2D image comprising a subset of the pixels; generating, by the processing circuitry, the training calibrated multi-spectral data cube of the training record by doing the following for at least one given pixel of the subset of pixels: querying, by the processing circuitry, the material data-base for a list of possible materials, being materials having the material group of the given pixel; removing, by the processing circuitry, materials from the list of possible materials having a probability below a first threshold to exist in the 2D image in accordance with the rules of the heuristic table and with the properties of the 3D model, giving rise to a redacted list of possible materials; determining, by the processing circuitry, a matched material for the given pixel from the redacted list of possible materials based on a match between the color of the given pixel and the typical colors associated with the materials from the redacted list of possible materials; selecting, by the processing circuitry, at least part of the spectral reflectance signature vector associated with the matched material to be part of the training calibrated multi-spectral data cube at the location of the given pixel; and generating, by the processing circuitry, the training un-calibrated multi-spectral data cube of the training record utilizing the training calibrated multi-spectral data cube and an atmospheric simulator, the atmospheric simulator capable of receiving: (i) the training calibrated multi-spectral data cube, and (ii) one or more atmospheric conditions, and generating the training un-calibrated multi-spectral data cube that corresponds to the training calibrated multi-spectral data cube under the atmospheric conditions.

In some cases, the two or more training records of the training records include different un-calibrated multi-spectral data cubes generated from the same calibrated multi-spectral data cube under different atmospheric conditions.

In some cases, the calibration process is an atmospheric calibration process.

In some cases, the one or more properties of the 3D model include one or more of: geographical area, sunlight angles, or viewing distance.

In some cases, the one or more atmospheric conditions include one or more of: moisture levels, sunlight angles, aerosol models, visibility scores, or geographic areas.

In some cases, the processing circuitry is further configured to add target pixels to the 3D model before the capturing of the 2D image.

In some cases, the generation of the training un-calibrated multi-spectral data cube further includes adding texture to the generated training calibrated multi-spectral data cube based on texture associated with the corresponding captured 2D images.

In some cases, the generation of the training un-calibrated multi-spectral data cube further includes adding a simulated registration error.

In some cases, the generation of the training un-calibrated multi-spectral data cube further includes blurring at least one of the corresponding captured 2D images before the generation.

In some cases, the generation of the training un-calibrated multi-spectral data cube further includes adding shot noise to at least one of the corresponding captured 2D images before the generation.

In accordance with a ninth aspect of the presently disclosed subject matter, there is provided a non-transitory computer readable storage medium having computer readable program code embodied therewith, the computer readable program code, executable by at least one processing circuitry of a computer to perform a method comprising: obtaining, by a processing circuitry, (A) a three-dimensional (3D) model of a scene, the 3D model having one or more properties and comprising a collection of pixels, wherein at least one pixel of the pixels is associated with: (a) a color, and (b) a label indicative of a material group that an element within the scene associated with the pixel is made of, (B) a material data-base comprising a list of materials, at least one material is associated with: (i) a spectral reflectance signature vector of the material, (ii) a typical color of the material, and (iii) a given material group of the material, and (C) a heuristic table comprising one or more rules, each rule defines a probability of an existence of a given material within a given scene based on the properties of the given scene; capturing, by the processing circuitry, a two-dimensional (2D) image from the 3D model of the scene, the 2D image comprising a subset of the pixels; generating, by the processing circuitry, the training calibrated multi-spectral data cube of the training record by doing the following for at least one given pixel of the subset of pixels: querying, by the processing circuitry, the material data-base for a list of possible materials, being materials having the material group of the given pixel; removing, by the processing circuitry, materials from the list of possible materials having a probability below a first threshold to exist in the 2D image in accordance with the rules of the heuristic table and with the properties of the 3D model, giving rise to a redacted list of possible materials; determining, by the processing circuitry, a matched material for the given pixel from the redacted list of possible materials based on a match between the color of the given pixel and the typical colors associated with the materials from the redacted list of possible materials; selecting, by the processing circuitry, at least part of the spectral reflectance signature vector associated with the matched material to be part of the training calibrated multi-spectral data cube at the location of the given pixel; and generating, by the processing circuitry, the training un-calibrated multi-spectral data cube of the training record utilizing the training calibrated multi-spectral data cube and an atmospheric simulator, the atmospheric simulator capable of receiving: (i) the training calibrated multi-spectral data cube, and (ii) one or more atmospheric conditions, and generating the training un-calibrated multi-spectral data cube that corresponds to the training calibrated multi-spectral data cube under the atmospheric conditions.

In accordance with a tenth aspect of the presently disclosed subject matter, there is provided a system for detecting one or more target materials in an un-calibrated multi-spectral data cube comprising a collection of pixels, the system comprising a processing circuitry configured to: obtain: (A) a machine learning model capable of receiving the un-calibrated multi-spectral data cube and determining for at least one pixel of the pixels at least one material indicator, indicative of existence of a given target material of the target materials at the location of the pixel, wherein the machine learning model is trained utilizing a labeled training-data set comprising of a plurality of training records, each training record comprising: (i) a training un-calibrated multi-spectral data cube, and (ii) at least one training material indicator associated with at least one pixel of the training un-calibrated multi-spectral data cube, indicative of existence of the target material at the location of the pixel, and (B) the un-calibrated multi-spectral data cube; and determine for at least one pixel of the pixels of the un-calibrated multi-spectral data cube, at least one material indicator, and a corresponding calibrated multi-spectral data cube, wherein the corresponding calibrated multi-spectral data cube is calculated by utilizing a calibration process and an atmospheric simulator that simulates a plurality of simulated un-calibrated multi-spectral data cubes by simulation of different atmospheric conditions over the calibrated multi-spectral cube.

In some cases, the machine learning model is one or more of: a convolutional neural network encoder-decoder model, a fully connected neural network model, a U-Net model, a U-Net++ model, a perceptrons model, an inception model, a resnet model, a Visual Geometry Group (VGG) model, an alexnet model, a densenet model, a mobilenet model or a visual transformer model.

In some cases, the machine learning model further includes vision transformers.

In some cases, the un-calibrated multi-spectral data cube is captured by one or more multi-spectral sensors.

In accordance with an eleventh aspect of the presently disclosed subject matter, there is provided a method for detecting one or more target materials in an un-calibrated multi-spectral data cube comprising a collection of pixels, the method comprising: obtaining, by a processing circuitry, (A) a machine learning model capable of receiving the un-calibrated multi-spectral data cube and determining for at least one pixel of the pixels at least one material indicator, indicative of existence of a given target material of the target materials at the location of the pixel, wherein the machine learning model is trained utilizing a labeled training-data set comprising of a plurality of training records, each training record comprising: (i) a training un-calibrated multi-spectral data cube, and (ii) at least one training material indicator associated with at least one pixel of the training un-calibrated multi-spectral data cube, indicative of existence of the target material at the location of the pixel, and (B) the un-calibrated multi-spectral data cube; and determining, by the processing circuitry, for at least one pixel of the pixels of the un-calibrated multi-spectral data cube, at least one material indicator, and a corresponding calibrated multi-spectral data cube, wherein the corresponding calibrated multi-spectral data cube is calculated by utilizing a calibration process and an atmospheric simulator that simulates a plurality of simulated un-calibrated multi-spectral data cubes by simulation of different atmospheric conditions over the calibrated multi-spectral cube.

In some cases, the machine learning model is one or more of: a convolutional neural network encoder-decoder model, a fully connected neural network model, a U-Net model, a U-Net++ model, a perceptrons model, an inception model, a resnet model, a Visual Geometry Group (VGG) model, an alexnet model, a densenet model, a mobilenet model or a visual transformer model.

In some cases, the machine learning model further includes vision transformers.

In some cases, the un-calibrated multi-spectral data cube is captured by one or more multi-spectral sensors.

In accordance with a twelfth aspect of the presently disclosed subject matter, there is provided a non-transitory computer readable storage medium having computer readable program code embodied therewith, the computer readable program code, executable by at least one processing circuitry of a computer to perform a method comprising: obtaining, by a processing circuitry, (A) a machine learning model capable of receiving the un-calibrated multi-spectral data cube and determining for at least one pixel of the pixels at least one material indicator, indicative of existence of a given target material of the target materials at the location of the pixel, wherein the machine learning model is trained utilizing a labeled training-data set comprising of a plurality of training records, each training record comprising: (i) a training un-calibrated multi-spectral data cube, and (ii) at least one training material indicator associated with at least one pixel of the training un-calibrated multi-spectral data cube, indicative of existence of the target material at the location of the pixel, and (B) the un-calibrated multi-spectral data cube; and determining, by the processing circuitry, for at least one pixel of the pixels of the un-calibrated multi-spectral data cube, at least one material indicator, and a corresponding calibrated multi-spectral data cube, wherein the corresponding calibrated multi-spectral data cube is calculated by utilizing a calibration process and an atmospheric simulator that simulates a plurality of simulated un-calibrated multi-spectral data cubes by simulation of different atmospheric conditions over the calibrated multi-spectral cube.

In accordance with a thirteenth aspect of the presently disclosed subject matter, there is provided a system for empirical atmospheric calibration utilizing automatically identified objects within an image of a scene, the system comprising a processing circuitry configured to: obtain: (A) a machine learning model capable of receiving the image of the scene and identify the existence of at least one object of the automatically identified objects within the scene, each identified object is associated with: (i) a location within the scene, and (ii) a pre-determined representative reflective spectral signature, and (B) the image of the scene; identify the existence of at least one object of the automatically identified objects within the image of the scene utilizing the machine learning model and the image of the scene; and calibrate an un-calibrated multi-spectral data cube associated with the scene utilizing an empirical atmospheric calibration process and based on the location and the pre-determined representative reflective spectral signatures associated with the automatically identified objects.

In some cases, the machine learning model is one or more of: a convolutional neural network encoder-decoder model, a fully connected neural network model, a U-Net model, a U-Net++ model, a perceptrons model, an inception model, a resnet model, a Visual Geometry Group (VGG) model, an alexnet model, a densenet model, a mobilenet model or a visual transformer model.

In some cases, the machine learning model further includes vision transformers.

In some cases, the un-calibrated multi-spectral data cube is captured by one or more multi-spectral sensors.

In accordance with a fourteenth aspect of the presently disclosed subject matter, there is provided a method for empirical atmospheric calibration utilizing automatically identified objects within an image of a scene, the method comprising: obtaining, by a processing circuitry, (A) a machine learning model capable of receiving the image of the scene and identify the existence of at least one object of the automatically identified objects within the scene, each identified object is associated with: (i) a location within the scene, and (ii) a pre-determined representative reflective spectral signature, and (B) the image of the scene; identifying, by the processing circuitry, the existence of at least one object of the automatically identified objects within the image of the scene utilizing the machine learning model and the image of the scene; and calibrating, by the processing circuitry, an un-calibrated multi-spectral data cube associated with the scene utilizing an empirical atmospheric calibration process and based on the location and the pre-determined representative reflective spectral signatures associated with the automatically identified objects.

In some cases, the machine learning model is one or more of: a convolutional neural network encoder-decoder model, a fully connected neural network model, a U-Net model, a U-Net++ model, a perceptrons model, an inception model, a resnet model, a Visual Geometry Group (VGG) model, an alexnet model, a densenet model, a mobilenet model or a visual transformer model.

In some cases, the machine learning model further includes vision transformers.

In some cases, the un-calibrated multi-spectral data cube is captured by one or more multi-spectral sensors.

In accordance with a fifteenth aspect of the presently disclosed subject matter, there is provided a non-transitory computer readable storage medium having computer readable program code embodied therewith, the computer readable program code, executable by at least one processing circuitry of a computer to perform a method comprising: obtaining, by a processing circuitry, (A) a machine learning model capable of receiving the image of the scene and identify the existence of at least one object of the automatically identified objects within the scene, each identified object is associated with: (i) a location within the scene, and (ii) a pre-determined representative reflective spectral signature, and (B) the image of the scene; identifying, by the processing circuitry, the existence of at least one object of the automatically identified objects within the image of the scene utilizing the machine learning model and the image of the scene; and calibrating, by the processing circuitry, an un-calibrated multi-spectral data cube associated with the scene utilizing an empirical atmospheric calibration process and based on the location and the pre-determined representative reflective spectral signatures associated with the automatically identified objects.

In accordance with a sixteenth aspect of the presently disclosed subject matter, there is provided a system for determining a registered multi-spectral data cube from one or more two-dimensional (2D) images of a scene, each 2D image acquired at a different wavelength range, wherein each image is taken from a different viewpoint of the scene, and wherein the registered multi-spectral data cube can be potentially generated from the 2D images by a registration process, the system comprising a processing circuitry configured to: obtain: (A) a machine learning model capable of receiving: (a) a source 2D image of the 2D images of the scene, and (b) a target 2D image of the 2D images of the scene, and determining a corresponding flow map mapping changes to be made to pixels of the source 2D image in order to align the source 2D image with the target 2D image, wherein the machine learning model is trained utilizing a training-data set comprising of a plurality of training records, each training record comprising: (i) a training source 2D image, (ii) a training target 2D image, and (iii) one or more training flow maps mapping changes to be made to pixels of the training source 2D image in order to align the training source 2D image with the training target 2D image, and (B) given 2D images of the scene, each given 2D image having a different wavelength range, wherein each image is taken from a different viewpoint of the scene; determine at least one given flow map for at least one given source 2D image of the given 2D images and for at least one given target 2D image of the given 2D images, wherein the given flow map maps changes to be made to pixels of the given source 2D image in order to align the given source 2D image with the given target 2D image, by utilizing the machine learning model on the given source 2D image and the given target 2D image; and generate the registered multi-spectral data cube utilizing the given source 2D images, the corresponding given flow maps, and a remap function.

In some cases, at least one given training record of the training-data set is generated by: obtaining: (A) a three-dimensional (3D) model of a scene, the 3D model having one or more properties and comprising a collection of pixels, wherein at least one pixel of the pixels is associated with: (a) a color, and (b) a label indicative of a material group that an element within the scene associated with the pixel is made of, (B) a material data-base comprising a list of materials, at least one material is associated with: (i) a spectral reflectance signature vector of the material, (ii) a typical color of the material, and (iii) a given material group of the material, and (C) a heuristic table comprising one or more rules, each rule defines a probability of an existence of a given material within a given scene based on the properties of the given scene; capturing at least one 2D image from the 3D model of the scene, each 2D image is captured from a different viewpoint of the scene, each 2D image comprising a subset of the pixels, each training 2D image is associated with a different wavelength range giving rise to the training source 2D image of the given training record; selecting for at least one training source 2D image a training target 2D image of the 2D images captured from the 3D model giving rise to the training target 2D image of the given training record; generate the training flow maps of the given training record by doing the following for at least one given pixel of the subset of pixels of the training source 2D image: query the material data-base for a list of possible materials, being materials having the material group of the given pixel; remove materials from the list of possible materials having a probability below a first threshold to exist in the 2D image in accordance with the rules of the heuristic table and with the properties of the 3D model, giving rise to a redacted list of possible materials; determine a matched material for the given pixel from the redacted list of possible materials based on a match between the color of the given pixel and the typical colors associated with the materials from the redacted list of possible materials; select a corresponding part of the spectral reflectance signature vector associated with the matched material in accordance with the wavelength of the 2D image to be part of the training source 2D image at the location of the given pixel; and generate the training flow maps of the given training record mapping changes to be made to pixels of the source 2D image in order to align the source 2D image with the target 2D image.

In some cases, at least one consecutive pair of the 2D images of the scene overlap by more than an overlap threshold.

In some cases, the machine learning model is one or more of: a convolutional neural network encoder-decoder model, a fully connected neural network model, a U-Net model, a U-Net++ model, a perceptrons model, an inception model, a resnet model, a Visual Geometry Group (VGG) model, an alexnet model, a densenet model, a mobilenet model or a visual transformer model.

In some cases, the machine learning model further includes vision transformers.

In some cases, the one or more properties of the 3D model include one or more of: geographical area, sunlight angles, and viewing distance.

In accordance with a seventeenth aspect of the presently disclosed subject matter, there is provided a method for determining a registered multi-spectral data cube from one or more two-dimensional (2D) images of a scene, each 2D image acquired at a different wavelength range, wherein each image is taken from a different viewpoint of the scene, and wherein the registered multi-spectral data cube can be potentially generated from the 2D images by a registration process, the method comprising: obtaining, by a processing circuitry, (A) a machine learning model capable of receiving: (a) a source 2D image of the 2D images of the scene, and (b) a target 2D image of the 2D images of the scene, and determining a corresponding flow map mapping changes to be made to pixels of the source 2D image in order to align the source 2D image with the target 2D image, wherein the machine learning model is trained utilizing a training-data set comprising of a plurality of training records, each training record comprising: (i) a training source 2D image, (ii) a training target 2D image, and (iii) one or more training flow maps mapping changes to be made to pixels of the training source 2D image in order to align the training source 2D image with the training target 2D image, and (B) given 2D images of the scene, each given 2D image having a different wavelength range, wherein each image is taken from a different viewpoint of the scene; determining, by the processing circuitry, at least one given flow map for at least one given source 2D image of the given 2D images and for at least one given target 2D image of the given 2D images, wherein the given flow map maps changes to be made to pixels of the given source 2D image in order to align the given source 2D image with the given target 2D image, by utilizing the machine learning model on the given source 2D image and the given target 2D image; and generating, by the processing circuitry, the registered multi-spectral data cube utilizing the given source 2D images, the corresponding given flow maps, and a remap function.

In some cases, at least one given training record of the training-data set is generated by: obtaining: (A) a three-dimensional (3D) model of a scene, the 3D model having one or more properties and comprising a collection of pixels, wherein at least one pixel of the pixels is associated with: (a) a color, and (b) a label indicative of a material group that an element within the scene associated with the pixel is made of, (B) a material data-base comprising a list of materials, at least one material is associated with: (i) a spectral reflectance signature vector of the material, (ii) a typical color of the material, and (iii) a given material group of the material, and (C) a heuristic table comprising one or more rules, each rule defines a probability of an existence of a given material within a given scene based on the properties of the given scene; capturing at least one 2D image from the 3D model of the scene, each 2D image is captured from a different viewpoint of the scene, each 2D image comprising a subset of the pixels, each training 2D image is associated with a different wavelength range giving rise to the training source 2D image of the given training record; selecting for at least one training source 2D image a training target 2D image of the 2D images captured from the 3D model giving rise to the training target 2D image of the given training record; generate the training flow maps of the given training record by doing the following for at least one given pixel of the subset of pixels of the training source 2D image: query the material data-base for a list of possible materials, being materials having the material group of the given pixel; remove materials from the list of possible materials having a probability below a first threshold to exist in the 2D image in accordance with the rules of the heuristic table and with the properties of the 3D model, giving rise to a redacted list of possible materials; determine a matched material for the given pixel from the redacted list of possible materials based on a match between the color of the given pixel and the typical colors associated with the materials from the redacted list of possible materials; select a corresponding part of the spectral reflectance signature vector associated with the matched material in accordance with the wavelength of the 2D image to be part of the training source 2D image at the location of the given pixel; and generate the training flow maps of the given training record mapping changes to be made to pixels of the source 2D image in order to align the source 2D image with the target 2D image.

In some cases, at least one consecutive pair of the 2D images of the scene overlap by more than an overlap threshold.

In some cases, the machine learning model is one or more of: a convolutional neural network encoder-decoder model, a fully connected neural network model, a U-Net model, a U-Net++ model, a perceptrons model, an inception model, a resnet model, a Visual Geometry Group (VGG) model, an alexnet model, a densenet model, a mobilenet model or a visual transformer model.

In some cases, the machine learning model further includes vision transformers.

In some cases, the one or more properties of the 3D model include one or more of: geographical area, sunlight angles, and viewing distance.

In accordance with an eighteenth aspect of the presently disclosed subject matter, there is provided a non-transitory computer readable storage medium having computer readable program code embodied therewith, the computer readable program code, executable by at least one processing circuitry of a computer to perform a method comprising: obtaining, by a processing circuitry, (A) a machine learning model capable of receiving: (a) a source 2D image of the 2D images of the scene, and (b) a target 2D image of the 2D images of the scene, and determining a corresponding flow map mapping changes to be made to pixels of the source 2D image in order to align the source 2D image with the target 2D image, wherein the machine learning model is trained utilizing a training-data set comprising of a plurality of training records, each training record comprising: (i) a training source 2D image, (ii) a training target 2D image, and (iii) one or more training flow maps mapping changes to be made to pixels of the training source 2D image in order to align the training source 2D image with the training target 2D image, and (B) given 2D images of the scene, each given 2D image having a different wavelength range, wherein each image is taken from a different viewpoint of the scene; determining, by the processing circuitry, at least one given flow map for at least one given source 2D image of the given 2D images and for at least one given target 2D image of the given 2D images, wherein the given flow map maps changes to be made to pixels of the given source 2D image in order to align the given source 2D image with the given target 2D image, by utilizing the machine learning model on the given source 2D image and the given target 2D image; and generating, by the processing circuitry, the registered multi-spectral data cube utilizing the given source 2D images, the corresponding given flow maps, and a remap function.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 9 is a flowchart illustrating an example of a sequence of operations carried out for detecting one or more target materials in an un-calibrated multi-spectral data cube, in accordance with the presently disclosed subject matter;

FIG. 11 is a flowchart illustrating an example of a sequence of operations carried out for determining a registered multi-spectral data cube from one or more two-dimensional images of a scene, in accordance with the presently disclosed subject matter;

DETAILED DESCRIPTION

Figure 1:
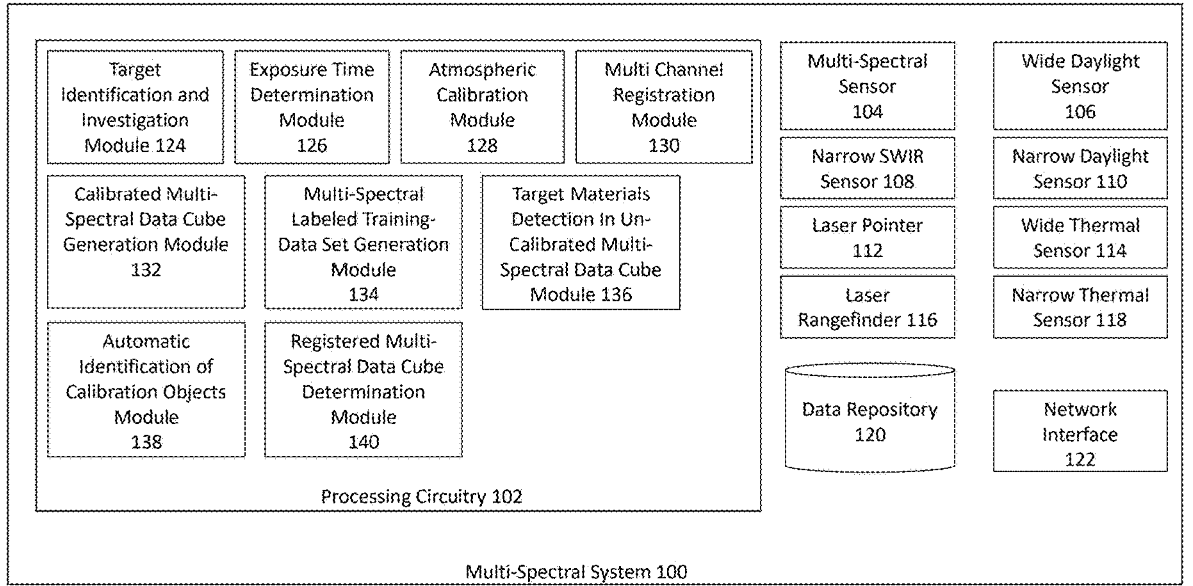
FIG. 1 is a block diagram schematically illustrating one example of a real-time multi-spectral system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in details so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "identifying", "capturing", "investigating", "calculating", "generating", "determining" or the like, include action and/or processes of a computer that manipulate and/or transform data into other data, said data represented as physical quantities, e.g., such as electronic quantities, and/or said data representing the physical objects. The terms "computer", "processor", "processing resource", "processing circuitry", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. Digital Signal Processor (DSP), a Graphics Processing Unit (GPU), a microcontroller, a Field Programmable Gate Array (FPGA), an Application Specific Integrated Circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 3-11 may be executed. In embodiments of the presently disclosed subject matter one or more stages illustrated in FIGS. 3-11 may be executed in a different order and/or one or more groups of stages may be executed simultaneously. FIGS. 1-2 illustrate a general schematic of the system architecture in accordance with an embodiment of the presently disclosed subject matter. Each module in FIGS. 1-2 can be made up of any combination of software, hardware and/or firmware that performs the functions as defined and explained herein. The modules in FIGS. 1-2 may be centralized in one location or dispersed over more than one location. In other embodiments of the presently disclosed subject matter, the system may comprise fewer, more, and/or different modules than those shown in FIGS. 1-2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, showing a block diagram schematically illustrating one example of a real-time multi-spectral system, in accordance with the presently disclosed subject matter.

In accordance with the presently disclosed subject matter, the real-time multi-spectral system 100 (also interchangeably referred to herein as "multi-spectral system 100" or as "system 100") can comprise a multi-spectral sensor 104 capable of capturing image data within specific wavelength ranges across the electromagnetic spectrum, for example: in visible (VIS) wavelengths, in ultraviolet (UV) wavelength, in Short-Wave Infrared (SWIR) wavelengths, in Near Infrared (NIR) wavelengths, in Middle Wavelength Infrared (MWIR) wavelengths, in Long Wavelength Infrared (LWIR) wavelengths, etc., or in any combination thereof. The wavelengths may be separated by multiple filters or detected with the use of instruments that are sensitive to particular wavelengths, including light from frequencies beyond the visible light range, e.g., near infrared, short-wave infrared, infrared and ultra-violet. As a non-limiting example, the multi-spectral sensor 104 is capable of acquiring images of a given scene or a given Field of View (FOV) in a plurality of imaging channels, each having a different wavelength range by utilizing a single sensor with at least one rotating filter wheel. The filter wheel is used to rotatably position a filter with a given wavelength range in the imaging path of the sensor to capture an image in that wavelength range. The filter in the imaging path of the sensor at a given time-window and/or interval of time is the active filter at that time window. The wheel is then turned to position the next filter, which has a different wavelength range in the imaging path of the sensor allowing the sensor to capture an image in the different wavelength range. Rotating the filter wheel allows the multi-spectral sensor 104 to capture a series of images in multiple wavelength ranges over a given time-frame. The rotating filter wheel can have a rotation axis that is parallel or perpendicular to the optical axis of multi-spectral sensor 104. In some cases, the rotating filter wheel rotates around the detector of multi-spectral sensor 104. The number of filters on the filter wheel determine the number of images of different wavelength ranges can be captured by multi-spectral sensor 104. Multi-spectral sensor 104 can alternatively comprise two or more filter wheels, which can be used to combine different filters from each of the filter wheels simultaneously. In addition, multi-spectral sensor 104 can alternatively utilize one or more of the following filter methods: (a) a Fabry-Pérot interferometer (FPI), (b) a Linear Variable filter (LVF), and (c) a circular variable filter. Multi-spectral sensor 104 can be alternatively comprised of multiple sensors, each sensor captures images of the scene at a different wavelength range, or a combination of multiple sensors with filters enabling each sensor to capture different wavelength ranges. The filter wheel embodiment allows the multi-spectral sensor 104 to have a small footprint relative to a multi-spectral sensor 104 that uses multiple sensors to capture images of the given scene in multiple wavelength ranges over a given time-frame. System 100 can optionally have the capability to send different commands to multi-spectral sensor's 104 detector for each of the filters on the filter wheel. System 100 can optionally have the capability to sample multiple frames-per-filter (for example, between 1 and 50 frames-per-filter). System 100 can optionally have the capability to calculate an average number of frames to be used for each filter on the filter wheel. Optionally, the multi-spectral sensor 104 can be implemented using a Short-Wave Infra-Red (SWIR) sensor, capable of capturing the given scene in SWIR wavelengths. In some cases, the multi-spectral sensor 104 can be implemented using a Visible-SWIR (VIS-SWIR) sensor, capable of capturing the given scene in visible and/or SWIR wavelengths. In some cases, the SWIR sensor or the VIS-SWIR sensor can be a wide angled spectral SWIR sensor or a wide angled spectral VIS-SWIR sensor, capable of capturing the given scene in SWIR wavelengths at a wide viewing angle or in VIS-SWIR wavelengths at a wide viewing angle. Optionally, the multi-spectral sensor 104 can be coupled with the rotating filter wheel, used to rotatably position a filter with a given wavelength range in the imaging path of the multi-spectral sensor 104 to capture an image in that wavelength range. In some cases, the multi-spectral sensor 104, can include a wide SWIR simple mode (also called: wide SWIR standard imaging mode) wherein no filter is applied to the sensor, for example: by placing a portion of the filter wheel that has no filter in the imaging path of the sensor. The multi-spectral sensor 104 can be used to capture spectral data that is utilized to generate a spectral data cube (also referred herein as: "a multi-spectral data cube") of the given scene. A spectral data cube contains two spatial dimensions (x and y) and one spectral dimension, in which the cube face is a function of the spatial coordinates, and the pixel resolution of the multi-spectral sensor 104, representing the captured scene and the depth is a function of the wavelength ranges of the multiple imaging channels or the multiple filters on the filter wheel used by multi-spectral sensor 104. A spectral data cube provides an easy way to read, manipulate, analyze, and write data which has two positional dimensions and one spectral dimension.

The process of capturing the spectral data cube can be as follows: multi-spectral sensor 104 captures a raw spectral data cube. The raw spectral data cube comprises of the gray-level values representative of the scene, as captured by the multi-spectral sensor 104. System 100 can perform radiometric correction on the raw spectral data cube to generate a radiometric spectral data cube. The information comprised within the radiometric spectral data cube has physical meaning in relation with objects within the scene and the power of their radiance. System 100 can than perform atmospheric correction on the radiometric spectral data cube to generate a reflectance spectral data cube. The reflectance spectral data cube comprises information that relates to the reflectance of the objects within the scene—how much those objects reflect in each of the wavelengths captured by multi-spectral sensor 104. It is to noted that when refereeing to a spectral data cube herein the meaning is to a radiometric spectral data cube, unless otherwise explained.

The multi-spectral system 100 can analyze the spectral data cube to identify pixels of the two spatial dimensions that correspond to a spectral signature of a given material type that the system is trying to detect within the given scene. A non-limiting example is the multi-spectral sensor 104 having a filter wheel with 12 different filters. Such a multi-spectral sensor 104 will generate a spectral data cube of the given scene within the given time-frame with a depth of 12. Each pixel on the face of the spectral data cube represents an area of the scene and is associated with a 12-value vector. Each value in this vector is associated with the spectral data captured by the multi-spectral sensor 104 for that area of the scene, within that time-frame for the wavelength range associated with the corresponding filter on the filter wheel.

Multi-spectral system 100 can optionally utilize Machine Learning (ML) and/or Artificial Intelligence (AI) models (also referred herein as: "machine learning models") to perform at least part of the processes of capturing the spectral data cube, analyzing the spectral data cube, detecting targets and/or any other aspect of the processes performed by the multi-spectral system 100. These AI and/or ML processes can include, but are not limited to: a process for automatically generating a calibrated multi-spectral data cube from an un-calibrated multi-spectral data cube, a process for detecting one or more target materials in an un-calibrated multi-spectral data cube, a process for empirical atmospheric calibration utilizing automatically identified objects within an image of a scene, a process for determining a registered multi-spectral data cube from one or more two-dimensional images of a scene, etc. These AI and/or ML processes are further detailed below.

In addition, system 100 can automatically generate hyper-spectral and/or multi-spectral training data-sets. These automatically generated training data-sets can be ground truth and/or labeled data-sets—where the system 100 automatically generates one or more pairs comprising of a training un-calibrated multi-spectral data cube, and a corresponding training calibrated multi-spectral data cube. The corresponding training calibrated multi-spectral data cube is generatable from the training un-calibrated multi-spectral data cube by a calibration process. It is noted that the generated training data-sets can be used by system 100 itself, for example: for training the machine models that provide automatic generation of a calibrated multi-spectral data cube from an un-calibrated multi-spectral data cube. The generated training data-sets can also be used by other systems, external to system 100 for a variety of tasks, for example: to train machine learning models requiring hyperspectral and/or multi-spectral training data-sets as part of their training process. The process of generating hyperspectral and/or multi-spectral training data-sets is further detailed below.

As explained above, multi-spectral sensor 104 can capture a raw multi-spectral data cube (also referred herein as: "un-calibrated multi-spectral data cube"). The raw multi-spectral data cube can comprise the gray-level values representative of the given scene, as captured by the multi-spectral sensor 104. System 100 can perform one or more calibration processes on the raw multi-spectral data cube. These can include: radiometric correction of the raw multi-spectral data cube to generate a radiometric spectral data cube, atmospheric correction on the radiometric spectral data cube to generate a reflectance spectral data cube, or a combination thereof. In some cases, the raw multi-spectral data cube can be obtained by utilizing other sensors and/or from another system, external to system 100. The calibration processes can be performed by system 100 employing an analytical calibration process using a given correction algorithm, as further detailed herein, inter alia with reference to FIG. 4. Additionally, or alternately, system 100 can perform the calibration of the raw multi-spectral data cube by utilizing an automatic calibration based on machine learning models as detailed herein.

Machine learning models are programs that can find patterns or make decisions from a previously unseen dataset. Machine learning models can solve problems for which development of algorithms by human programmers would be cost-prohibitive, and instead the problems are solved by helping machines 'discover' their 'own' algorithms, without needing to be explicitly told what to do by any human-developed algorithms. The machine learning model has the ability to perform accurately on new, unseen examples/tasks after having experienced a learning data set used to train the machine learning model. The training examples come from some generally unknown probability distribution (considered representative of the space of occurrences) and the AI and/or ML process builds a general model about this space that enables it to produce sufficiently accurate predictions when encountering new cases.

The process for automatically generating a calibrated multi-spectral data cube from an un-calibrated multi-spectral data cube can utilize a machine learning model that has been trained on a training data set that comprises multiple pairs, each pair comprises an un-calibrated multi-spectral data cube, and a corresponding calibrated multi-spectral data cube. The calibrated multi-spectral data cube is potentially generatable from the un-calibrated multi-spectral data cube by a calibration process (for example: by an atmospheric calibration process). The training data set has ground truth (labeled) information from different scenes. At least part of the training data set can be automatically generated by utilizing an atmospheric simulator on one more calibrated multi-spectral data cubes. The automatic generation of training data can be used to enlarge and diversify the input training and testing data for the machine learning model. The atmospheric simulator is capable of receiving a calibrated multi-spectral data cube and one or more atmospheric conditions (such as: moisture levels, sunlight angles, aerosol models, visibility scores, or geographic areas, etc.) and to generate one or more un-calibrated multi-spectral data cube that corresponds to the calibrated multi-spectral data cube under the atmospheric conditions. System 100 can utilize the atmospheric simulator to generate more than one un-calibrated multi-spectral data cube from a single given calibrated multi-spectral data cube using different atmospheric conditions, thus allowing to easily create the pairs of the training data set from a small number of calibrated multi-spectral data cubes. A non-limiting example of such an atmospheric simulator is the MODerate resolution atmospheric TRANsmission (MODTRAN) computer code. In addition, at least part of the training data set can be automatically generated by utilizing an automatic generation of a multi-spectral labeled training-data set process, as further detailed herein.

The trained machine learning model is capable of receiving a given un-calibrated multi-spectral data cube and generating the corresponding calibrated multi-spectral data cube. The generated corresponding calibrated multi-spectral data cube is equivalent to a result of applying an analytical calibration process on the given un-calibrated multi-spectral data cube. The machine learning model can have, as part of the training process, a loss function that representing the cost of inaccuracy of predictions. The loss function in the machine learning model can determine the weight and the bias for at least some of the pixels of the un-calibrated multi-spectral data cube.

Utilizing the machine learning model to generate the calibrated multi-spectral data cube from the un-calibrated multi-spectral data cube has a number of advantages over the more traditional way of applying the analytical calibration process using a given correction algorithm on the un-calibrated multi-spectral data cube to generate the corresponding calibrated multi-spectral data cube: the machine learning model can perform atmospheric correction on the un-calibrated multi-spectral data cube to generate an atmospheric calibrated multi-spectral data cube that has reflectance information that relates to the reflectance of the objects within the scene that are captured in the multi-spectral data cube-how much those objects reflect in each of the wavelengths. In some cases, the atmospheric correction can include a tools matching correction that corrects discrepancies between the multi-spectral sensor 104 and the known spectrum of the captured materials. In addition, the machine learning model can operate on the pixel level, thus potentially applying different optimization parameters (for example: illumination angle, illumination distance) for different pixels of the un-calibrated multi-spectral data-cube. In contrast, the analytical calibration process usually determines just one set of optimization parameters to be used for all the pixels of the un-calibrated multi-spectral data cube.

The machine learning model can be built utilizing one or more of the following model architectures: an encoder-decoder model, a convolutional neural network encoder-decoder model, a fully connected neural network model, a U-Net model, a U-Net++ model, a perceptrons model, an inception model, a resnet model, a Visual Geometry Group (VGG) model, an alexnet model, a densenet model, a mobilenet model, a visual transformer model, or any other model architecture that can be used when building and training a machine learning model. In some cases, the machine learning model can be a neural-networks that processes videos of consecutive multi-spectral data cubes with one or more of the abovementioned model architectures combined with one or more of the following architectures: Recurrent Neural Network (RNN), Long Short-Term Memory networks (LSTM), Gated Recurrent Unit (GRU), visual transformers, Bidirectional Encoder Representations from Transformers (BERT), dilated convolutional networks, Temporal Convolutional Networks (TCN), Ordinary Differential Equation (ODE), etc. The training of the machine learning model can include pruning. The machine learning model can be also trained utilizing a reinforcement learning method. The machine learning model can further include vision transformers. The vision transformers can enable the machine learning model to code one or more segments within the un-calibrated multi-spectral data cube.

Figure 12:
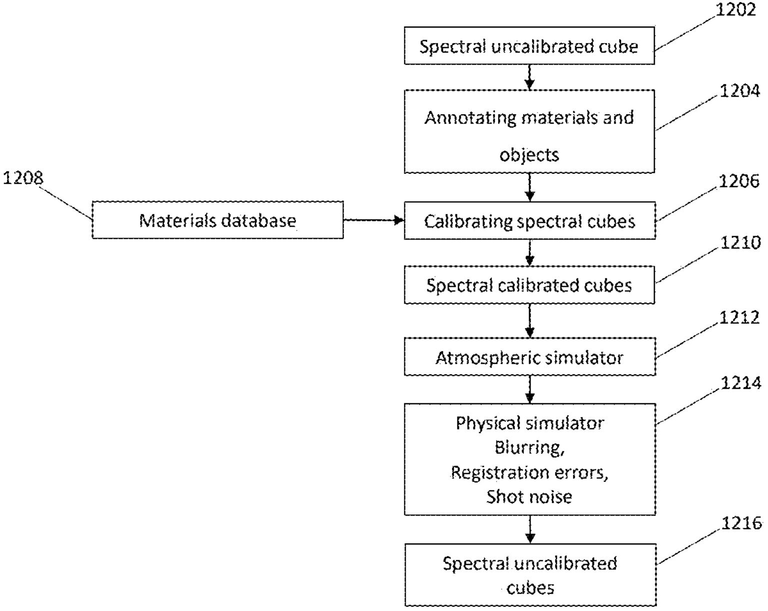
FIG. 12 is an example of a steps carried out for automatically generating a calibrated multi-spectral data cube from an un-calibrated multi-spectral data cube, in accordance with the presently disclosed subject matter.

A non-limiting example of steps and stages of the process for automatically generating a calibrated multi-spectral data cube from an un-calibrated multi-spectral data cube are depicted in FIG. 12. At step 1202 at least one given un-calibrated multi-spectral data cube is used as input to the process. At step 1204 the given un-calibrated multi-spectral data cube is annotated by tagging and/or labeling elements with known spectral reflectance that are captured in one or more of the layers of the given un-calibrated multi-spectral data cube. The annotation associates the values of the spectral reflectance with the elements. In some cases, the tagging is done automatically. In other cases, the tagging is done by a human operator of system 100. At step 1206 the annotated given un-calibrated multi-spectral data cube undergoes a calibration process utilizing the annotations of the tagged materials with their known spectral reflectance and with the data from the materials database of step 1208. The results in step 1210 are one or more calibrated multi-spectral data cubes. At step 1212 an atmospheric simulator is utilized to generate one or more un-calibrated multi-spectral data cubes (resulting in step 1216) that corresponds to the calibrated multi-spectral data cube under the atmospheric conditions. At step 1214, additionally, and/or optionally, a physical simulator can be used on the calibrated multi-spectral data cube to add an optical blurring effect and/or to add one or more registration errors and/or to add shot noise when generating the one or more un-calibrated multi-spectral data cubes (resulting in step 1216). The atmospheric simulator is capable of receiving a calibrated multi-spectral data cube and one or more atmospheric conditions (such as: moisture levels, sunlight angles, aerosol models, visibility scores, or geographic areas, etc.) and to generate one or more un-calibrated multi-spectral data cube that corresponds to the calibrated multi-spectral data cube under the atmospheric conditions. System 100 can utilize the atmospheric simulator to generate more than one un-calibrated multi-spectral data cube with known target material from a single given calibrated multi-spectral data cube using different atmospheric conditions, thus allowing to easily create a large training data set from a small number of calibrated multi-spectral data cubes which are labeled with known target materials and their location within the scene. A non-limiting example of such an atmospheric simulator is the MODerate resolution atmospheric TRANsmission (MODTRAN) computer code. In addition, at least part of the training data set can be automatically generated by utilizing an automatic generation of a multi-spectral labeled training-data set process, as further detailed herein.

The process for automatically generating a calibrated multi-spectral data cube from an un-calibrated multi-spectral data cube can be performed by system 100 as part of other processes executed by system 100 (for example: as part of a target identification and investigation process executed by system 100). In other cases, the process for automatically generating a calibrated multi-spectral data cube from an un-calibrated multi-spectral data cube can be performed by system 100 as a standalone process, independent of other processes executed by system 100. The results of the process for automatically generating a calibrated multi-spectral data cube from an un-calibrated multi-spectral data cube can also be used by other systems, external to system 100 for a variety of tasks.

Figure 7:
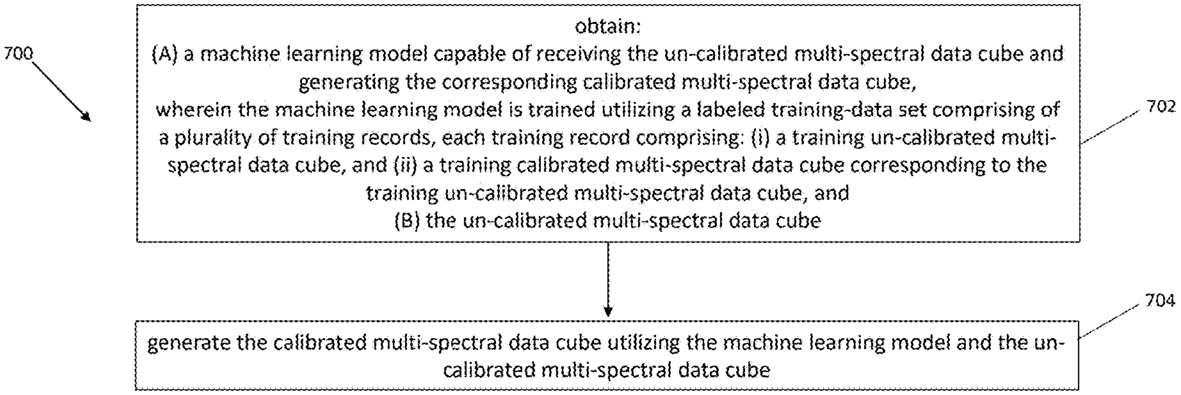
FIG. 7 is a flowchart illustrating an example of a sequence of operations carried out for automatically generating a calibrated multi-spectral data cube from an un-calibrated multi-spectral data cube, in accordance with the presently disclosed subject matter.

The process for automatically generating a calibrated multi-spectral data cube from an un-calibrated multi-spectral data cube is further detailed herein, inter alia with reference to FIG. 7.

Figure 3:
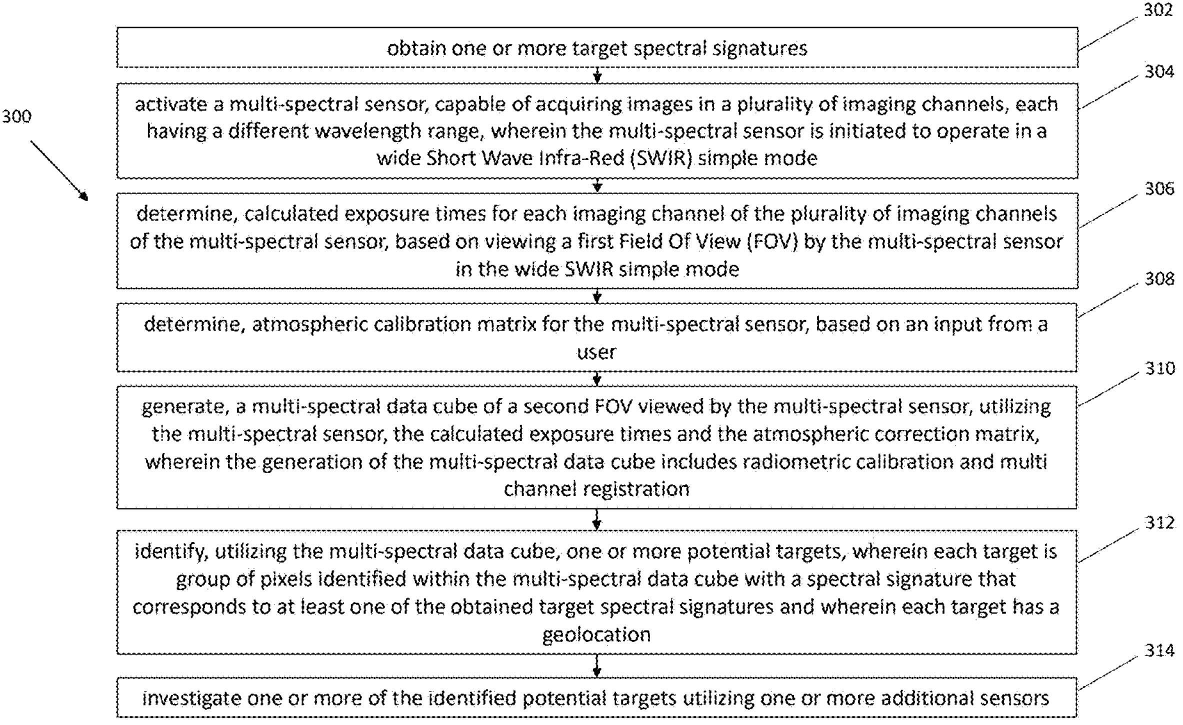
FIG. 3 is a flowchart illustrating an example of a sequence of operations carried out by a real-time multi-spectral system for target detection and further investigation, in accordance with the presently disclosed subject matter.

System 100 can perform a target identification and investigation process, as further detailed herein, inter alia with reference to FIG. 3. The target identification and investigation process can be performed by applying multiple analytical steps to a given un-calibrated multi-spectral data cube maintaining the raw spectral data captured by a multi-spectral sensor (such as: multi-spectral sensor 104). These multiple analytical steps can include: radiometric correction of the un-calibrated multi-spectral data cube, atmospheric correction of the un-calibrated multi-spectral data cube and detection of targets on the corrected multi-spectral data cubes, etc. At least part of these steps of the target identification and investigation process can be performed by detecting target materials directly from an un-calibrated multi-spectral data cube by utilizing a machine learning model. The utilization of the machine learning model saves at least some of the aforementioned steps, thus save computation time and is less prone to errors. The machine learning model used for detecting target materials directly from a given un-calibrated multi-spectral data cube is capable of receiving the given un-calibrated multi-spectral data cube and determining for at least one of the pixels of the given un-calibrated multi-spectral data cube at least one material indicator. The material indicator is indicative of the existence of a given target material of the target materials at the location of the pixel. The process for detecting one or more target materials in an un-calibrated multi-spectral data cube allows for semantic registration of the target materials upon the pixels—each pixel is mapped to a vector of target materials indicators (for example: a vector of binary indicators for each given target material that indicate if that given target material exists in that pixel). As the machine learning model works at the pixel level, it can detect target materials which occupies a single pixel within the un-calibrated multi-spectral data cube, this is in contrast with analytical methods which usually require more than one pixel of a given target material for detection. In some cases, the machine learning model can detect target materials in sub-pixel dimensions. In these cases, a given target material actual size is smaller than the associated pixel, but because the machine learning model operated on the pixel level—the entire pixel is lit for the given target material indicating its existence within the scene.

The process for detecting one or more target materials in an un-calibrated multi-spectral data cube can utilize a machine learning model that has been trained on a training data set that is trained utilizing a labeled training-data set comprising of a plurality of training records, each training record comprising a training un-calibrated multi-spectral data cube, and at least one training material indicator associated with at least one pixel of the training un-calibrated multi-spectral data cube, indicative of existence of the target material at the location of the pixel. The training material indicators can be, for example, vectors of binary indicators (each binary indicator is indicative of a given target material) associated with the corresponding pixels. The training data set has ground truth (labeled) information from different scenes. At least part of the training data set can be automatically generated by utilizing an atmospheric simulator on one more calibrated multi-spectral data cubes with known target material labels. The automatic generation of training data can be used to enlarge and diversify the input training and testing data for the machine learning model. The atmospheric simulator is capable of receiving a calibrated multi-spectral data cube and one or more atmospheric conditions (such as: moisture levels, sunlight angles, aerosol models, visibility scores, or geographic areas, etc.) and to generate one or more un-calibrated multi-spectral data cube that corresponds to the calibrated multi-spectral data cube under the atmospheric conditions. System 100 can utilize the atmospheric simulator to generate more than one un-calibrated multi-spectral data cube with known target material from a single given calibrated multi-spectral data cube using different atmospheric conditions, thus allowing to easily create a large training data set from a small number of calibrated multi-spectral data cubes which are labeled with known target materials and their location within the scene. A non-limiting example of such an atmospheric simulator is the MODerate resolution atmospheric TRANsmission (MODTRAN) computer code. In addition, at least part of the training data set can be automatically generated by utilizing an automatic generation of a multi-spectral labeled training-data set process, as further detailed herein.

The machine learning model used for detecting target materials directly from a given un-calibrated multi-spectral data cube can be built by utilizing one or more of the following model architectures: an encoder-decoder model, a convolutional neural network encoder-decoder model, a fully connected neural network model, a U-Net model, a U-Net++ model, a perceptrons model, an inception model, a resnet model, a Visual Geometry Group (VGG) model, an alexnet model, a densenet model, a mobilenet model, a visual transformer model, or any other model architecture that can be used when building and training a machine learning model. In some cases, the machine learning model can be a neural-networks that processes videos of consecutive multi-spectral data cubes with one or more of the abovementioned model architectures combined with one or more of the following architectures: Recurrent Neural Network (RNN), Long Short-Term Memory networks (LSTM), Gated Recurrent Unit (GRU), visual transformers, Bidirectional Encoder Representations from Transformers (BERT), dilated convolutional networks, Temporal Convolutional Networks (TCN), Ordinary Differential Equation (ODE), etc. The training of the machine learning model can include pruning. The machine learning model can be also trained utilizing a reinforcement learning method. The machine learning model can further include vision transformers. The vision transformers can enable the machine learning model to code one or more segments within the un-calibrated multi-spectral data cube.

The process for detecting one or more target materials in an un-calibrated multi-spectral data cube can be performed by system 100 as part of other processes executed by system 100 (for example: as part of a target identification and investigation process executed by system 100). In other cases, the process for detecting one or more target materials in an un-calibrated multi-spectral data cube can be performed by system 100 as a standalone process, independent of other processes executed by system 100. The results of the process for detecting one or more target materials in an un-calibrated multi-spectral data cube can also be used by other systems, external to system 100 for a variety of tasks.

The process for detecting one or more target materials in an un-calibrated multi-spectral data cube is further detailed herein, inter alia with reference to FIG. 9.

The target identification and investigation process performed by system 100 comprises of multiple steps, as further detailed herein, inter alia with reference to FIG. 3. These steps can optionally include determining, based on an input from a user of system 100, an atmospheric calibration matrix for the multi-spectral sensor 104. A non-limiting example of such a user dependent step is of the user utilizing controls to move a cursor over an image captured by system 100 and indicating that the pixels corresponding to the location of the cursor are of an object with known reflectivity (for example: indicating that the cursor is on a road, a tree, gravel, etc.). System 100 can then use the known reflectivity of these pixels in the image to determine the atmospheric calibration matrix. At least part of this step of identifying one or more objects with known reflectivity within an image of a scene by a user can be automated and performed by an empirical atmospheric calibration utilizing automatically identified objects within an image of a scene process that can automatically identify calibration objects within the scene. The empirical atmospheric calibration utilizing automatically identified objects within an image of a scene process can utilize a machine learning model. The usage of the machine learning model saves at least parts of the aforementioned step, thus save computation time and is less prone to user errors. The machine learning model used for the process for empirical atmospheric calibration utilizing automatically identified objects within an image of a scene is capable of receiving an image of the scene and identifying the existence of at least one automatically identified object within the scene. The automatically identified object is associated with a given location within the scene and with a pre-determined representative reflective spectral signature of that object. System 100 can use the at least one automatically identified object within the image of the scene to determine the atmospheric calibration matrix, without relying on the user of the system 100 to manually select the calibration objects.

The process for empirical atmospheric calibration utilizing automatically identified objects within an image of a scene can identify the existence of one or more objects (for example: a given road) within the image of the scene. These automatically identified objects can be used by system 100 as calibration objects. The identification of these calibration objects can be achieved utilizing the machine learning model and the image of the scene. The process can than calibrate an un-calibrated multi-spectral data cube associated with the scene utilizing an empirical atmospheric calibration process and based on the location and the pre-determined representative reflective spectral signatures associated with the one or more identified calibration objects.

The machine learning model used for automatically identifying the objects within the image of a scene can be built by utilizing one or more of the following model architectures: an encoder-decoder model, a convolutional neural network encoder-decoder model, a fully connected neural network model, a U-Net model, a U-Net++ model, a perceptrons model, an inception model, a resnet model, a Visual Geometry Group (VGG) model, an alexnet model, a densenet model, a mobilenet model, a visual transformer model, or any other model architecture that can be used when building and training a machine learning model. In some cases, the machine learning model can be a neural-networks that processes videos of consecutive multi-spectral data cubes with one or more of the abovementioned model architectures combined with one or more of the following architectures: Recurrent Neural Network (RNN), Long Short-Term Memory networks (LSTM), Gated Recurrent Unit (GRU), visual transformers, Bidirectional Encoder Representations from Transformers (BERT), dilated convolutional networks, Temporal Convolutional Networks (TCN), Ordinary Differential Equation (ODE), etc. The training of the machine learning model can include pruning. The machine learning model can be also trained utilizing a reinforcement learning method. The machine learning model can further include vision transformers. The vision transformers can enable the machine learning model to code one or more segments within the image of the scene.

The process for empirical atmospheric calibration utilizing automatically identified objects within an image of a scene can be performed by system 100 as part of other processes executed by system 100 (for example: as part of the target identification and investigation process executed by system 100). In other cases, the process for empirical atmospheric calibration utilizing automatically identified objects within an image of a scene can be performed by system 100 as a standalone process, independent of other processes executed by system 100. The results of the process for empirical atmospheric calibration utilizing automatically identified objects within an image of a scene can also be used by other systems, external to system 100 for a variety of tasks.

Figure 10:
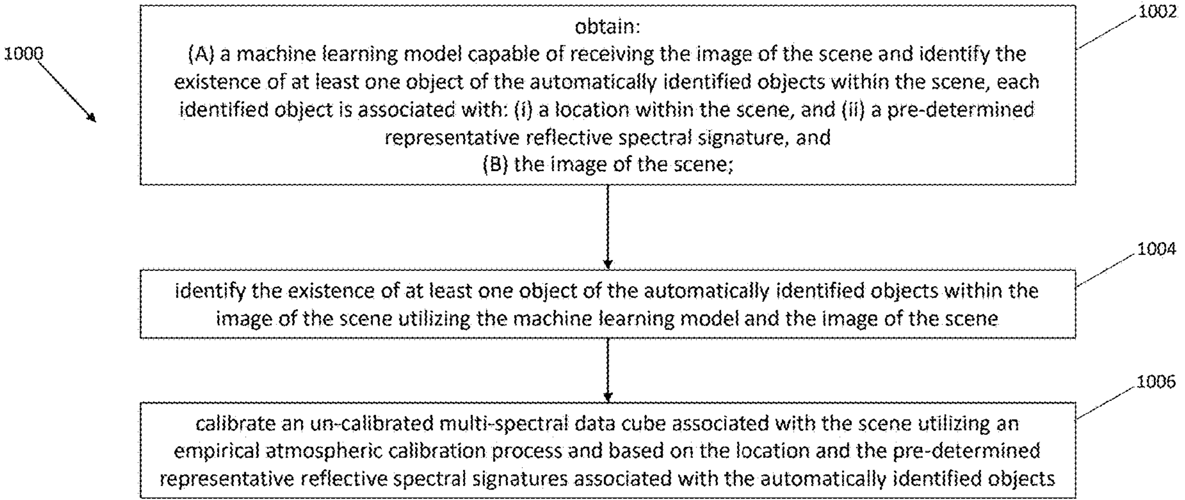
FIG. 10 is a flowchart illustrating an example of a sequence of operations carried out for empirical atmospheric calibration utilizing automatically identified objects within an image of a scene, in accordance with the presently disclosed subject matter.

The process for empirical atmospheric calibration utilizing automatically identified objects within an image of a scene is further detailed herein, inter alia with reference to FIG. 10.

In some cases, the target identification and investigation process performed by system 100 includes registration of multiple images into one coordinate system that will be used to build the un-calibrated multi-spectral data cube. For a non-limiting example, in cases where system 100 is moving while capturing the images of the scene and where multi-spectral sensor 104 is coupled with a rotating filter wheel, used to rotatably position a filter with a given wavelength range in the imaging path of the multi-spectral sensor 104 to capture an image in that wavelength range, the captured images have different angles and different capture times of the scene. There is thus a need to align and register the captured images unto one coordinate system before generating a multi-spectral data cube.

Figure 6:
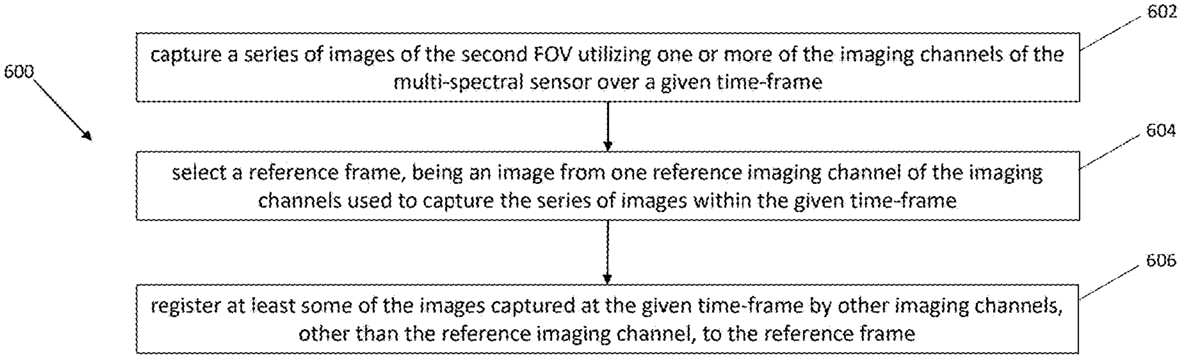
FIG. 6 is a flowchart illustrating an example of a sequence of operations carried out by a real-time multi-spectral system with multi-channel registration, in accordance with the presently disclosed subject matter.

The registration of the captured images can be analytical, utilizing a Multi-Channel Registration (MCR) algorithm that calculates a transformation matrix between pairs of the captured images, as further detailed herein, inter alia with reference to FIG. 6. MCR algorithms are limited in their ability to correctly perform parallax correction on the captured images. At least part of the registration process can be performed by system 100 using an AI and/or ML based registration. System 100 can execute a process for determining a registered multi-spectral data cube from one or more two-dimensional (2D) images of a scene that is AI and/or ML based. This AI and/or ML based registration process can better handle parallax correction for the captured images. The process for determining a registered multi-spectral data cube from one or more two-dimensional images of a scene can utilize a machine learning model that is capable of receiving a source 2D image of the captured images of the scene, and a target 2D image of the captured images, and determining a corresponding flow map mapping changes to be made to pixels of the source 2D image in order to align the source 2D image with the target 2D image. Continuing our non-limiting example above, the captured images can be a series of images captured by multi-spectral sensor 104 which is coupled with a rotating filter wheel as it moves above a scene (in this example, multi-spectral sensor 104 is housed on an airborne platform that is flying above the scene). Due to the movement of the multi-spectral sensor 104 above the scene, the captured images have each a different viewing angle of the scene. It is to be noted, that at least one consecutive pair of the captured images of the scene overlap by more than an overlap threshold.

The machine learning can receive a source 2D image and a target 2D image of the captured images and determine a flow map which maps changes to be made to pixels of the source 2D image in order to align the source 2D image with the target 2D image. This process can be done to one or more of the captured images using the same target 2D image (for example: the target 2D image can be the image captured at a midpoint time of the capturing of the series of images). The resulting flow maps can be utilized by system 100 to align the multiple source 2D images all to the same target 2D image, thus generating a registration for all the captured images. This can be used to produce a multi-spectral data cube from the aligned captured images.

The machine learning model is trained utilizing a training-data set comprising of a plurality of training records. Each training record comprises a training source 2D image, a training target 2D image, and one or more training flow maps mapping changes to be made to pixels of the training source 2D image in order to align the training source 2D image with the training target 2D image. In some cases, the training-data set can be automatically generated based on a three-dimensional (3D) model of a given scene. The 3D model can have one or more properties and can comprise a collection of pixels. At least one pixel of the pixels can be associated with a color, and a label indicative of a material group that an element within the scene associated with the pixel is made of. A non-limiting example of such 3D models are models used for rendering game scenes by a game engine (such as: unreal engine, etc.). In this example, the 3D model can be of a field used for growing strawberries. The 3D model can have properties, such as: geographical area/region, sunlight angles, viewing distance, and other properties of the 3D model. The pixels associated with the strawberries in the model can be associated with a color (for example: red) and with a label for a material group of fruit. The generation of the training-data set is also based on a material data-base and a heuristic table. The material data-base can comprise a list of materials. At least one material in the data-base can be associated with a spectral reflectance signature vector of the material, a typical color of the material, and a given material group of the material. For example: a group of materials can be soil. The soil group can be associated with a number of different materials registered in the data-base—like farmland, sea sand, desert sand, etc. Each of these specific soils is associated with a spectral reflectance signature vector of the material and a typical color of the material. The heuristic table comprises of one or more rules. Each rule defines a probability of an existence of a given material within a given scene based on the properties of the given scene. For example: the probability of the existence of desert sand in a scene with a property of a tropical jungle region is low. The generation of the training data-set can be done by simulating a “flight” over the scene within the 3D model. Simulating the capturing of a series of 2D images from the 3D model as if a multi-spectral sensor 104 has passed over the scene of the 3D model and captured a series of 2D images. Each simulated captured 2D image can be simulated to have a given wavelength using the 3D model, the material data-base and the heuristic table. A flow map can be generated for at least one of the simulated captured 2D images with reference to a selected simulated captured target 2D image based on the knowledge of the 3D model, because the changes needed to be made to pixels of the simulated captured 2D images in order to align them with the simulated captured target 2D image can be precisely calculated from the 3D model itself. The steps for generating the training data-set can include repeating the following for at least one given pixel of a given simulated captured 2D image of the simulated captured 2D images: querying the material data-base for a list of possible materials, being materials having the material group of the given pixel. Removing materials from the list of possible materials having a probability below a threshold to exist in the given simulated captured 2D image in accordance with the rules of the heuristic table and with the properties of the 3D model, giving rise to a redacted list of possible materials. Determining a matched material for the given pixel from the redacted list of possible materials based on a match between the color of the given pixel and the typical colors associated with the materials from the redacted list of possible materials, and selecting a corresponding part of the spectral reflectance signature vector associated with the matched material in accordance with the wavelength of the given simulated captured 2D image at the location of the given pixel. The generation of the training data-set can also include handling of occluded pixels within the simulated captured 2D images by estimating the color of the occluded pixels based on one or more surrounding pixels that are located in the vicinity of the occluded pixels within the 3D model.

The machine learning model used for determining a registered multi-spectral data cube from one or more two-dimensional images of a scene can be built by utilizing one or more of the following model architectures: an encoder-decoder model, a convolutional neural network encoder-decoder model, a fully connected neural network model, a U-Net model, a U-Net++ model, a perceptrons model, an inception model, a resnet model, a Visual Geometry Group (VGG) model, an alexnet model, a densenet model, a mobilenet model, a visual transformer model, or any other model architecture that can be used when building and training a machine learning model. In some cases, the machine learning model can be a neural-networks that processes videos of consecutive multi-spectral data cubes with one or more of the abovementioned model architectures combined with one or more of the following architectures: Recurrent Neural Network (RNN), Long Short-Term Memory networks (LSTM), Gated Recurrent Unit (GRU), visual transformers, Bidirectional Encoder Representations from Transformers (BERT), dilated convolutional networks, Temporal Convolutional Networks (TCN), Ordinary Differential Equation (ODE), etc. The training of the machine learning model can include pruning. The machine learning model can be also trained utilizing a reinforcement learning method. The machine learning model can further include vision transformers. The vision transformers can enable the machine learning model to code one or more segments within the captured 2D images of the scene.

Figure 13:
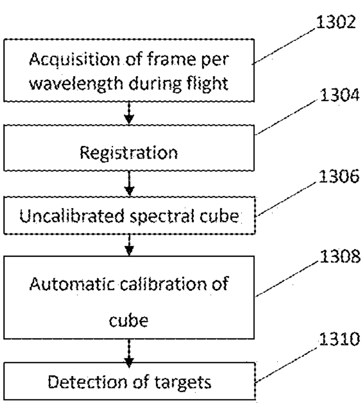
FIG. 13 is an example of a steps carried out for determining a registered multi-spectral data cube from one or more two-dimensional images of a scene, in accordance with the presently disclosed subject matter.
Figure 14:
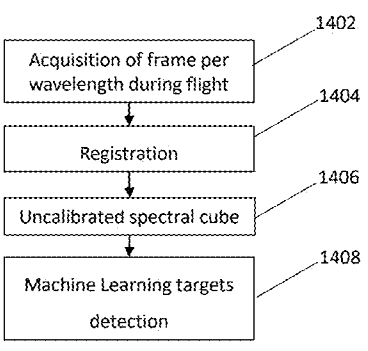
FIG. 14 is another example of a steps carried out for determining a registered multi-spectral data cube from one or more two-dimensional images of a scene, in accordance with the presently disclosed subject matter.

Two non-limiting examples of steps and stages of the process for determining a registered multi-spectral data cube from one or more two-dimensional images of a scene are depicted in FIGS. 13 and 14. At step 1302 in FIG. 13 one or more frames of a scene are captured utilizing a multi-spectral sensor 104. The capture can be for example during a flight of a platform to which multi-spectral sensor 104 is attached. A frame is captured per wavelength of the sensor. Each frame has a different angle towards the scene and targets within the scene due to the movement of the platform over the scene while capturing the frames. At step 1304 multiple frames having different wavelengths are registered onto one coordinate system. The result of the registration of the multiple frames into one coordinate system are one or more un-calibrated multi-spectral data cubes at step 1306. These un-calibrated multi-spectral data cubes undergo automatic calibration at step 1308 resulting in registered and calibrated multi-spectral data cubes (for example, by utilizing the process for automatically generating a calibrated multi-spectral data cube from an un-calibrated multi-spectral data cube). The registered and calibrated multi-spectral data cubes can be used by system 100 for detecting targets. Optionally, in FIG. 14 a machine learning target detection process is used at step 1408 directly on the registered un-calibrated multi-spectral data cubes of step 1406.

The process for determining a registered multi-spectral data cube from one or more two-dimensional images of a scene can be performed by system 100 as part of other processes executed by system 100 (for example: as part of a multi-channel registration process executed by system 100 to create a multi-spectral data cube). In other cases, the process for determining a registered multi-spectral data cube from one or more two-dimensional images of a scene can be performed by system 100 as a standalone process, independent of other processes executed by system 100. The results of the process for determining a registered multi-spectral data cube from one or more two-dimensional images of a scene can also be used by other systems, external to system 100 for a variety of tasks.

The process for determining a registered multi-spectral data cube from one or more two-dimensional images of a scene is further detailed herein, inter alia with reference to FIG. 11.

As described above, system 100 can automatically generate hyperspectral and/or multi-spectral training data-sets. The multi-spectral training-data set can comprise one or more training records, each training record comprises a training un-calibrated multi-spectral data cube and a training calibrated multi-spectral data cube. The training calibrated multi-spectral data cube is generatable from the training un-calibrated multi-spectral data cube by a calibration process (for example: by an atmospheric correction calibration process). The multi-spectral training-data set can be automatically generated based on a three-dimensional (3D) model of a given scene. The 3D model can have one or more properties and can comprise a collection of pixels. At least one pixel of the pixels can be associated with a color, and a label indicative of a material group that an element within the scene associated with the pixel is made of. A non-limiting example of such 3D models are models used for rendering game scenes by a game engine (such as: unreal engine, etc.). In this example, the 3D model can be of a field used for growing strawberries. The 3D model can have properties, such as: geographical area/region, sunlight angles, viewing distance, and other properties of the 3D model. The pixels associated with the strawberries in the model can be associated with a color (for example: red) and with a label for a material group of fruit. The generation of the training-data set is also based on a material data-base and a heuristic table. The material data-base can comprise a list of materials. At least one material in the data-base can be associated with a spectral reflectance signature vector of the material, a typical color of the material, and a given material group of the material. For example: a group of materials can be soil. The soil group can be associated with a number of different materials registered in the data-base—like farmland, sea sand, desert sand, etc. Each of these specific soils is associated with a spectral reflectance signature vector of the material and a typical color of the material. The heuristic table comprises of one or more rules. Each rule defines a probability of an existence of a given material within a given scene based on the properties of the given scene. For example: the probability of the existence of desert sand in a scene with a property of a tropical jungle region is low.

The generation of the training data-set can be done by simulating the capturing of a 2D image from the 3D model of the scene. The simulated captured 2D image comprising a subset of the pixels of the 3D model. Generating a training calibrated multi-spectral data cube of the training record by doing the following for at least one given pixel of the subset of pixels: querying the material data-base for a list of possible materials, being materials having the material group of the given pixel. Removing materials from the list of possible materials having a probability below a threshold to exist in the simulated captured 2D image in accordance with the rules of the heuristic table and with the properties of the 3D model, giving rise to a redacted list of possible materials. Determine a matched material for the given pixel from the redacted list of possible materials based on a match between the color of the given pixel and the typical colors associated with the materials from the redacted list of possible materials. Selecting at least part of the spectral reflectance signature vector associated with the matched material to be part of the training calibrated multi-spectral data cube at the location of the given pixel. And generating the training un-calibrated multi-spectral data cube of the training record utilizing the training calibrated multi-spectral data cube and an atmospheric simulator, the atmospheric simulator capable of receiving the training calibrated multi-spectral data cube, and one or more atmospheric conditions, and generating one or more training un-calibrated multi-spectral data cubes that corresponds to the training calibrated multi-spectral data cube under the atmospheric conditions. The atmospheric conditions can include: moisture levels, sunlight angles, aerosol models, visibility scores, geographic areas, or any other condition that is associated with the atmosphere or with its influence on captured imagery. In some cases, multiple training un-calibrated multi-spectral data cubes are generated from a single training calibrated multi-spectral data cube using different atmospheric conditions. In some cases, the generation of the training un-calibrated multi-spectral data cube further includes adding target pixels to the 3D model before the capturing of the 2D image, thus simulating various targets within the training data-set. In addition, the generation of the training un-calibrated multi-spectral data cube further includes adding texture to the generated training calibrated multi-spectral data cube based on texture associated with the corresponding simulated captured 2D images. This can be achieved by calculating for segments of a given simulated captured 2D image average color values of the pixels and using these calculated average color values for pixels within the generated training calibrated multi-spectral data cube. In some cases, the generation of the training un-calibrated multi-spectral data cube further includes adding a simulated registration error. For example: simulating typical registration errors by randomly changing at least one channel in relation to the other channels of the generated multi-spectral data cube. The generation of the training un-calibrated multi-spectral data cube can also further include blurring at least one of the corresponding simulated captured 2D images before the generation. The blurring can be for example by using a Point Spread Function (PSF) filter that emulates the physical blur of the multi-spectral sensor 104 that can be based on the actual performance of the multi-spectral sensor 104. In some cases, the generation of the training un-calibrated multi-spectral data cube further includes adding shot noise to at least one of the corresponding simulated captured 2D images before the generation.

Figure 15:
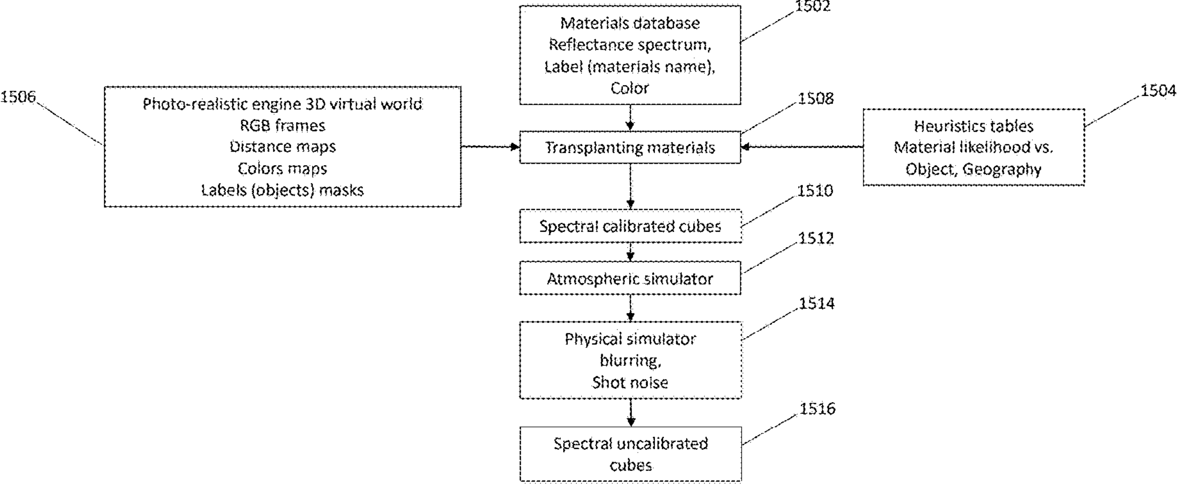
FIG. 15 is an example of a steps carried out for automatic generation of a multi-spectral labeled training-data set, in accordance with the presently disclosed subject matter.

A non-limiting example of steps and stages of the process for automatically generate hyperspectral and/or multi-spectral training data-sets are depicted in FIG. 15. At step 1502 a Materials database that stores a reflectance spectrum, a label (materials name), and a representative color for at least one type of material is used together with one or more heuristics tables from step 1504 and a photo-realistic engine of a 3D virtual world (such as: a game engine like the unreal engine, etc.) which includes RGB frames of the virtual world, distance maps within the virtual world, colors maps of scenes and objects within the virtual world and labels (objects) masks (from step 1506) to transplant materials into the virtual world. The heuristics tables hold one or more rules that define the likelihood of a material type to exist in a specific object and/or in a specific geography. At step 1510 calibrated multi-spectral data cubes are captured from the virtual world. At step 1512 an atmospheric simulator is utilized to generate one or more un-calibrated multi-spectral data cubes (resulting in step 1516) that corresponds to the calibrated multi-spectral data cube under the atmospheric conditions. At step 1514, additionally, and/or optionally, a physical simulator can be used on the calibrated multi-spectral data cube to add an optical blurring effect and/or to add one or more registration errors and/or to add shot noise when generating the one or more un-calibrated multi-spectral data cubes (resulting in step 1516). The atmospheric simulator is capable of receiving a calibrated multi-spectral data cube and one or more atmospheric conditions (such as: moisture levels, sunlight angles, aerosol models, visibility scores, or geographic areas, etc.) and to generate one or more un-calibrated multi-spectral data cube that corresponds to the calibrated multi-spectral data cube under the atmospheric conditions. System 100 can utilize the atmospheric simulator to generate more than one un-calibrated multi-spectral data cube with known target material from a single given calibrated multi-spectral data cube using different atmospheric conditions, thus allowing to easily create a large training data set from a small number of calibrated multi-spectral data cubes which are labeled with known target materials and their location within the scene. A non-limiting example of such an atmospheric simulator is the MODerate resolution atmospheric TRANsmission (MODTRAN) computer code. In addition, at least part of the training data set can be automatically generated by utilizing an automatic generation of a multi-spectral labeled training-data set process, as further detailed herein.

It is noted that the generated training data-sets can be used by system 100 itself, for example: for training the machine models that provide automatic generation of a calibrated multi-spectral data cube from an un-calibrated multi-spectral data cube. The generated training data-sets can also be used by other systems, external to system 100 for a variety of tasks, for example: to train machine learning models requiring hyperspectral and/or multi-spectral training data-sets as part of their training process. The process of generating hyperspectral and/or multi-spectral training data-sets is further detailed below.

Figure 8:
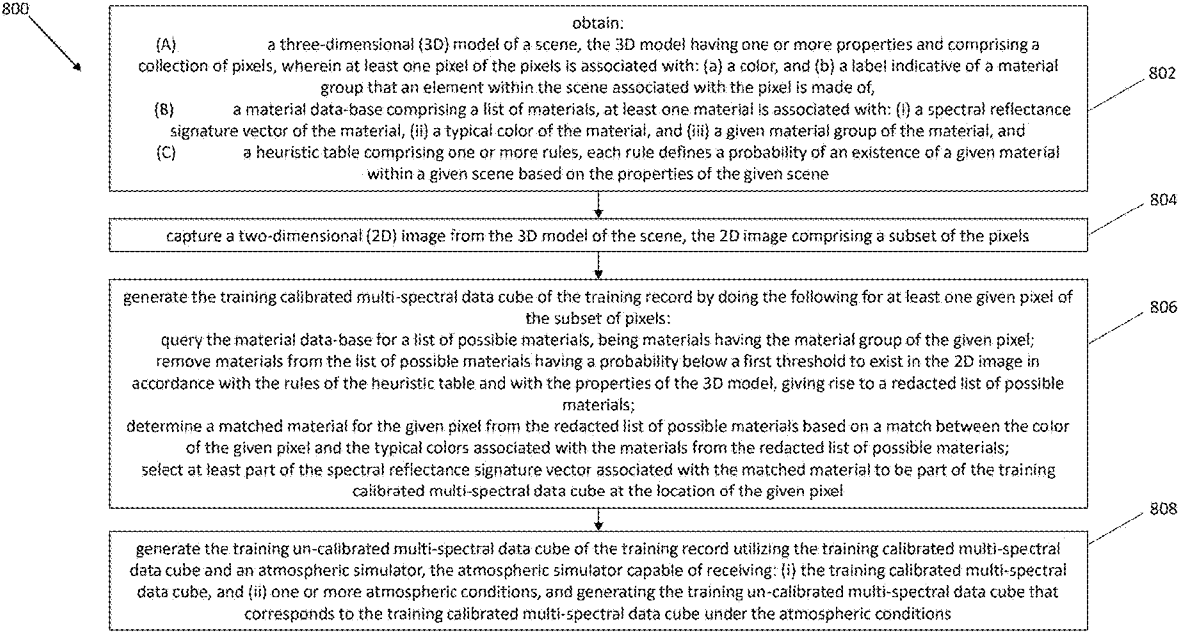
FIG. 8 is a flowchart illustrating an example of a sequence of operations carried out for automatic generation of a multi-spectral labeled training-data set, in accordance with the presently disclosed subject matter.

The process for generating hyperspectral and/or multi-spectral training data-sets is further detailed herein, inter alia with reference to FIG. 8.

Multi-spectral system 100 can optionally comprise additional sensors, that can be used to further investigate the given scene and specifically further investigate the potential targets identified by utilizing the spectral data cube generated by the multi-spectral sensor 104. These optional additional sensors can include: a wide daylight sensor 106 that can capture the given scene in visible light wavelengths at a wide viewing angle. A narrow daylight sensor 110 that can capture the given scene in visible light wavelengths at a narrow viewing angle. A wide sensor can be a wide thermal sensor 114 that can capture the given scene in infrared wavelengths at a wide viewing angle or a wide ultra-violet sensor that can capture the given scene in ultra-violet wavelengths at a wide viewing angle. A narrow sensor can be a narrow thermal sensor 118 that can capture the given scene in infrared or a narrow ultra-violet sensor that can capture the given scene in ultra-violet wavelengths at a narrow viewing angle. A narrow SWIR sensor 108 that can capture the given scene in SWIR wavelengths at a narrow viewing angle.

Multi-spectral system 100 can also optionally include a laser rangefinder 116. Laser rangefinder 116 can be utilized by system 100 to determine the distance to an object, for example: the distance to one of the potential targets identified utilizing the spectral data cube generated by the multi-spectral sensor 104 and further investigated utilizing one of the abovementioned additional sensors. Multi-spectral system 100 can optionally include a laser pointer 112. Laser pointer 112 can be used to mark the potential targets at night.

Multi-spectral system 100 can optionally comprise a network interface 122. The network interface 122 (e.g., a network card, a Wi-Fi client, a Li-Fi client, 3G/4G client, or any other component), enables system 100 to communicate over a network with external systems, such as a ground station system that has capabilities to manage system 100 remotely. Network interface 122 can handle inbound and outbound communications from such systems. For example, system 100 can receive, through network interface 122, a plurality of spectral target signatures, exposure time conversion matrixes, exposure times, reflectance values of one or more known object types, atmospheric calibration matrixes, images of a scene, spectral data cubes, identified potential targets and information relating to these targets, distances to targets, etc.

Multi-spectral system 100 can further comprise or be otherwise associated with a data repository 120 (e.g., a database, a storage system, a memory including Read Only Memory—ROM, Random Access Memory—RAM, or any other type of memory, etc.) configured to store data. Some examples of data that can be stored in the data repository 120 include: a plurality of spectral target signatures, exposure time conversion matrixes, exposure times, reflectance values of one or more known object types, atmospheric calibration matrixes, images of a scene, spectral data cubes, identified potential targets and information relating to these targets, distances to targets, etc. Data repository 120 can be further configured to enable retrieval and/or update and/or deletion of the stored data. It is to be noted that in some cases, data repository 120 can be distributed, while the system 100 has access to the information stored thereon, e.g., via a wired or wireless network to which system 100 is able to connect (utilizing its network interface 122).

Multi-spectral system 100 further comprises processing circuitry 102. Processing circuitry 102 can be one or more processing units (e.g., central processing units), microprocessors, microcontrollers (e.g., microcontroller units (MCUs)), (Graphics Processing Units) GPUs or any other computing devices or modules, including multiple and/or parallel and/or distributed processing units, which are adapted to independently or cooperatively process data and controlling relevant system 100 resources and for enabling operations related to system's 100 resources.

The processing circuitry 102 comprises modules, such as: a target identification and investigation module 124, an exposure time determination module 126, an atmospheric calibration module 128 a multi-channel registration module 130, a calibrated multi-spectral data cube generation module 132, a multi-spectral labeled training data set generation module 134, a target materials detection in un-calibrated multi-spectral data cube module 136, an automatic identification of calibration objects module 138, and a registered multi-spectral data cube determination module 140. The target identification and investigation module 124 is configured to perform a target identification and investigation process, as further detailed herein, inter alia with reference to FIG. 3. The exposure time determination module 126 is configured to perform an exposure time determination process, as further detailed herein, inter alia with reference to FIG. 4. The atmospheric calibration module 128 is configured to perform an automatic atmospheric calibration process, as further detailed herein, inter alia with reference to FIG. 5. The multi-channel registration module 130 is configured to perform a multi-channel registration process, as further detailed herein, inter alia with reference to FIG. 6. The calibrated multi-spectral data cube generation module 132 is configured to perform a process for automatically generating a calibrated multi-spectral data cube from an un-calibrated multi-spectral data cube, as further detailed herein, inter alia with reference to FIG. 7. The multi-spectral labeled training data set generation module 134 is configured to perform an automatic generation of a multi-spectral labeled training-data set process, as further detailed herein, inter alia with reference to FIG. 8. The target materials detection in un-calibrated multi-spectral data cube module 136 is configured to perform a process for detecting one or more target materials in an un-calibrated multi-spectral data cube, as further detailed herein, inter alia with reference to FIG. 9. The automatic identification of calibration objects module 138 is configured to perform a process for empirical atmospheric calibration utilizing automatically identified objects within an image of a scene, as further detailed herein, inter alia with reference to FIG. 10. The registered multi-spectral data cube determination module 140 is configured to perform a process for determining a registered multi-spectral data cube from one or more two-dimensional images of a scene, as further detailed herein, inter alia with reference to FIG. 11.

The real-time multi-spectral system 100 can be used to observe a given area. The system 100 can scan the given area using an "area scan" or a "Step and Stare mode" which includes scanning the scene segment by segment (and merging/stitching the segments spatial data cubes into one overall data map cube representing the entire given area), thereby controlling in observation the entire given area, or zoom out to view the entire given area within its FOV. In this mode, system 100 can hold an observation grip on the given area. "Step and Stare mode" can be performed by system 100 covering different segments of the given area (each segment is in the size of the FOV of the relevant sensors) by utilizing the multi-spectral sensor 104 and/or the additional sensors with overlapping margins creating a mosaic (of rows and columns) of segments to be stitched into one spectral data map cube. An example can be of system 100 scanning the given area with a 5% overlap in both X and Y axis. After completing a registration process for of the sections' spectral data cubes, system 100 stitches the segments into an overall spectral data cube for the entire given area by registration of the overlapping sections. In another possible mode, system 100 can automatically initiate the observation cycle and use an Artificial Intelligence (AI) and/or Machine Learning (ML) model for automatic determination of a threshold of potential target identification and/or AI and/or ML models for automatic spectral cubes calibration, thereby lowering the number of false alarms (positive and negative).

It should be noted that multi-spectral system 100 can operate as a standalone system without the need for network interface 122 and/or data repository 120. Adding one or both of these elements to system 100 is optional and not mandatory, as system 100 can operate according to its intended use either way. In some cases, some or all of the elements of multi-spectral system 100 can be distributed. For example, the additional sensors can be located in places remote from the location of the processing circuitry 102 and/or of the location of multi-spectral sensor 104. In these cases, system 100 can utilize network interface 122 to communicate and distribute information between the remotely located elements of the system 100. In some cases, the multi-spectral sensor 104 and one or more of the additional sensors are viewing the same given area in real-time and can be utilized by system 100 to investigate potential targets in the FOV in real-time or by viewing the images and/or videos captured by the sensors at a later time. This can optionally occur even when the additional sensors are located in a location that can view the given area and scan the FOV for potential targets but is different than the location of the multi-spectral sensor 104 itself.

System 100 is a real-time solution that performs additional potential target investigation utilizing additional sensors directed and observing the same potential targets in real-time. The system 100 real-time solution, improves the result significantly by changing online the parameters of the multi-spectral target detection system. The system 100 real-time solution provides a special robust solution for target tracking online. The system 100 real-time solution is robust for weather, direction of sun, atmospheric transmittance. It has automatic calibration correction. In summary, system 100 is an online multi-spectral imaging data system which is very different from other offline solutions.

Figure 2A:
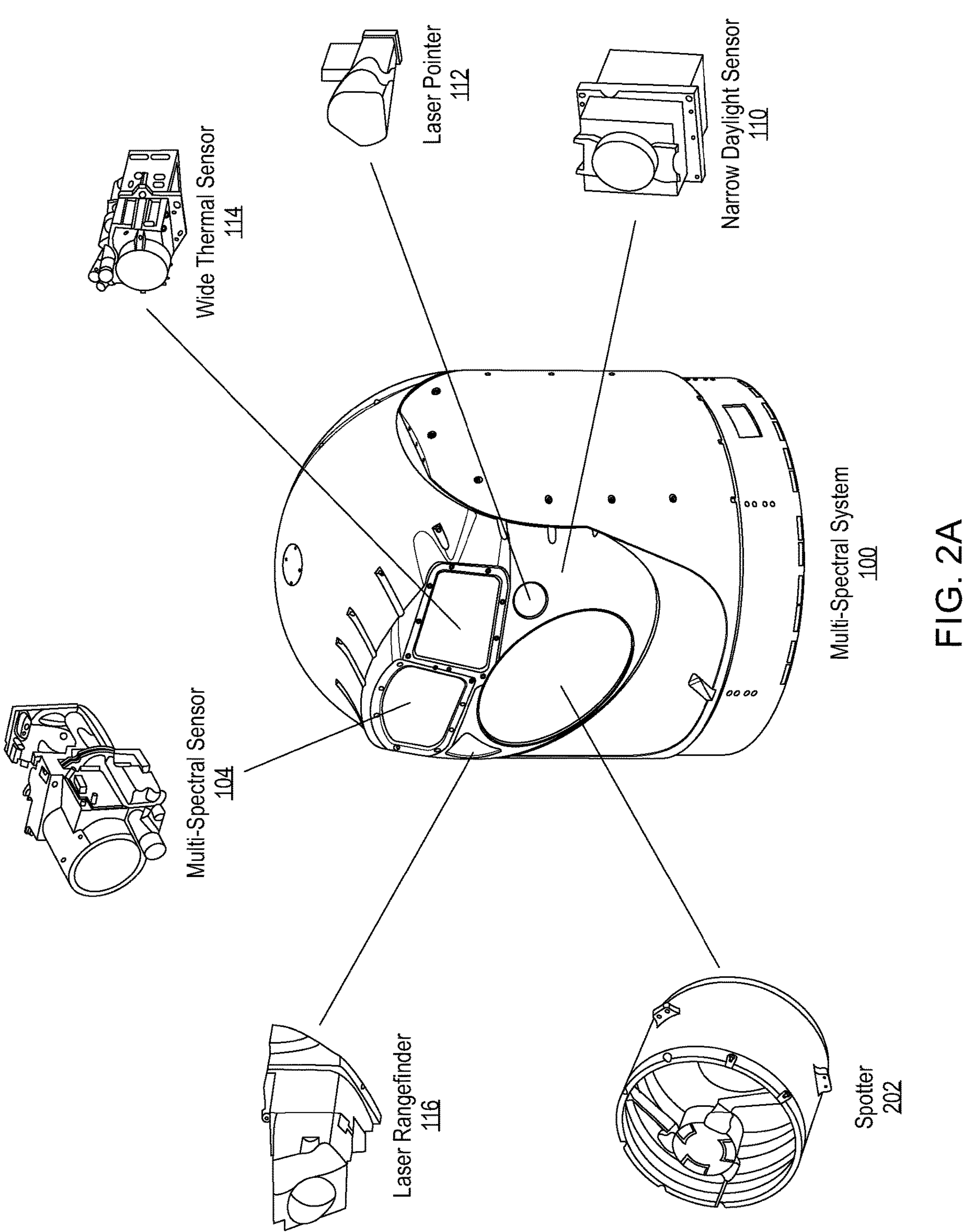
FIG. 2A is a schematic illustration of one possible exemplary configuration for a real-time multi-spectral system, in accordance with the presently disclosed subject matter.

Attention is now drawn to FIG. 2A, a schematic illustration of one possible exemplary configuration for the real-time multi-spectral system 100, in accordance with the presently disclosed subject matter.

In accordance with the presently disclosed subject matter, the real-time multi-spectral system 100 can be optionally enclosed within an observation pod. The observation pod can be used as a stand-alone system and/or can be installed as a special purpose payload on a platform, for example: on a personal platform, on a watch tower as part of a wider border defense system, on a ground vehicle, on an aerial platform, in space, etc. When system 100 is installed in an observation pod on an aerial platform, it can detect potential targets in a given scene in real-time, without the need to download information from the aerial platform to a ground station for human operator analysis. System 100 is capable of keeping observation capabilities on a given observed area by controlling the movement of the multi-spectral sensor's 104 lens and of the lenses of the additional sensors (e.g., the wide daylight sensor 106, the narrow daylight sensor 110, the wide thermal sensor 114, the narrow thermal sensor 118, the narrow SWIR sensor 108, the laser rangefinder 116, the laser pointer 112, etc.) while the platform is in motion. In many cases the various sensors in pod or payload, although they might have different FOVs, the center FOV of each sensor is aligned to the same direction, enabling the system to use different sensors for the same target location. The optical design of these lenses is optimized to perform minimal chromatic distortions to eliminate the spectral mixing across the FOV. In many cases, system 100 is installed on a gimbaled support that allows for compensating the movement of the platform while keeping the sensors on the given observed area. In these cases, system 100 utilizes multi-spectral sensor 104 to capture the given scene in multiple wavelength ranges, as the aerial platform flies over the given scene. The multi-spectral system 100 can generate a spectral data cube from the multi-spectral data captured by the multi-spectral sensor 104. System 100 can analyze the spectral data cube to identify pixels of the two spatial dimensions that correspond to a spectral signature of a given material type that the system is trying to detect within the given scene and mark them as targets or as potential targets. A spectral signature is the variation of reflectance of a material with respect to given wavelengths ranges. Looking for target spectral signatures allow system 100 to identify materials we are looking for within the scene. System 100 can utilize the multi-spectral sensor 104 and the additional sensors to detect and investigate potential targets in real-time. For example, as part of a flight of an aerial platform carrying system 100 above the given observed area. System 100 uses multi-spectral sensor 104 to generate the spectral data cube of the given observed area, to investigate and analyze the suspected potential targets using additional sensors and to identify potential targets within the spectral data cube all during the flight over the area, with no need to download the captured material for analysis in a ground station. This is achieved by system's 100 real-time analysis of the spectral data cube together with the input data coming from the additional sensors to better detect and identify the potential targets. To support real-time target detection system 100 utilizes one or more of the following processes as part of target identification: an exposure time determination process, as further detailed herein, inter alia with reference to FIG. 4, an atmospheric calibration process, as further detailed herein, inter alia with reference to FIG. 5, and a multi-channel registration process, as further detailed herein, inter alia with reference to FIG. 6.

A non-limiting example is a real-time multi-spectral system 100 that is used in an agriculture setting. In this setting the target spectral signature can be of a given agriculture product that system 100 is trying to identify and further investigate. For example, a spectral signature of a strawberry. The spectral signature of the strawberry is a vector associated with multiple values. Each value in this vector is associated with the spectral variation of reflectance or emittance of a strawberry in the wavelength ranges that can be captured by the multi-spectral sensor 104. Another example is of system 100 trying to identify special leaves (e.g., of artificial material) that are visually similar to all other leaves but are different in some invisible wavelength in which these special leaves have unique reflection which differs from regular leaves. In some cases, system 100 is not provided with specific target spectral signatures. In these cases, system 100 can determine if one or more anomalies exist in the spectral data cube of the given scene. Such anomalies are detected by system 100 when one or more pixels within the spectral data cube have a spectral signature that is distanced above a threshold distance from the other pixels of the data cube. A non-limiting example, is of a system 100 that is used in the Search and Rescue (S&R) domain. System 100 can observe an area of the ocean where a few survivors are floating on the waves. System 100 can utilize multi-spectral sensor 104 to generate a spectral data cube of the observed area and use it to detect pixels in the scene representing these survivors without getting a target spectral signature of these survivors—just by detecting them as anomalies on the background of the waves and rely the data about their location to an S&R team. The anomaly will be detected even in cases when the size of the survivor in the vast area of the ocean is significantly smaller than the size of a single pixel. Another non-limiting example is of detecting potential mobile targets by using system 100. In this example system 100 is used as an observation solution in the homeland security domain. System 100 can be located viewing an area of a border of a country or of a protected facility. The target spectral signatures are the materials of the garments worn by illegal trespassers trying to cross the protected border. Utilizing the multi-spectral sensor 104 to generate a spectral data cube of the observed area of the border and use it to detect pixels in the scene representing the garments materials. If such a target is observed and then lost as it moves out of the scene, system 100 can quickly acquire back the target by directing the optical line-of-sight of the multi-spectral sensor 104 to the area where the target moved to and generating a new spectral data cube of the new area and identify the target's garment materials in that new area, thus allowing a border patrol force to keep track of the target.

In some cases, new identified potential targets within a scene represented by the spectral data cube can be added as a new target spectral signatures for system 100 to store in data repository 120. System 100 can use these new target spectral signatures to try and detect corresponding potential targets in the future spectral data cube it will capture. The identification of such new potential targets can be done automatically by system 100 or by a human analyst who is a user of system 100.

It is to be noted, that system 100 can use the multi-spectral sensor 104 and the generated spectral data cube to identify multiple potential targets in a scene, by analyzing one or more groups of pixels within the spectral data cube having the target spectral signature. In addition, system 100 can look for potential targets corresponding to two or more target spectral signatures (for example, strawberries and blueberries) in the same scene.

FIG. 2A depicts a non-limiting exemplary hardware that can be used to realize system's 100 elements: multi-spectral sensor 104 can be implemented by a wide High Definition (HD) SWIR camera with a FOV of 5-25 degrees and zoom capabilities. The wide daylight sensor 106 can be implemented by a Visible-NIR (VNIR) camera with a FOV of 5-25 degrees and zoom capabilities. Wide thermal sensor 118 can be implemented by a Mid-wave Infrared (MWIR) camera with a FOV of 5-25 degrees and zoom capabilities. The narrow daylight sensor 110, the narrow thermal sensor 118 and the narrow SWIR sensor 108 can be all implemented using spotter 202 which is a unified telescope providing an imaging path for the three narrow angle sensors (narrow daylight sensor 110, narrow thermal sensor 118 and narrow SWIR sensor 108). These narrow angle sensors are also called spotters and can be used by a user of system 100 to further investigate one or more detected potential targets by analyzing the spectral data cube captured by the multi-spectral sensor 104. The multi-spectral sensor 104, can include a wide SWIR simple mode wherein no filter is applied to the sensor allowing system 100 to use the multi-spectral sensor 104 as a wide-angle SWIR sensor. The usage of the imaging sensors (e.g., the wide daylight sensor 106, the narrow daylight sensor 110, the wide thermal sensor 114, the narrow thermal sensor 118, the multi-spectral sensor 104, the narrow SWIR sensor 108, etc.) by system 100 having all sensors on the same optical line-of-sight, can be arranged so that when a zoom range of an imaging sensor of one family of wavelengths is reached (for example: the zoom limit of the wide thermal sensor 114), system 100 automatically switches to the narrow angled imaging sensor of the same family (continuing this example: switching to the narrow thermal sensor 118).

The exemplary hardware configuration of system 100 depicted in FIG. 2A can optionally include a laser rangefinder 116, for example: a narrow beam laser designator and range finder with wavelengths of 1-1.6 micro-meter laser beam. A laser pointer 112 can also be optionally included in system 100. A Night Vision Google (NVG) laser pointer with a wavelength of 800-900 nano-meter laser beam is an example of such a laser pointer 112 that can be part of system 100.

An environment can include two or more real-time multi-spectral system 100. These systems 100 can pass information between them utilizing their respective network interfaces 122. The information can include: targets, target spectral signatures, exposure times and atmospheric correction parameters. The sharing of information can allow a number of systems 100 to work together in observing a given scene and to identify potential targets by investigating certain potential targets together.

Figure 2B:
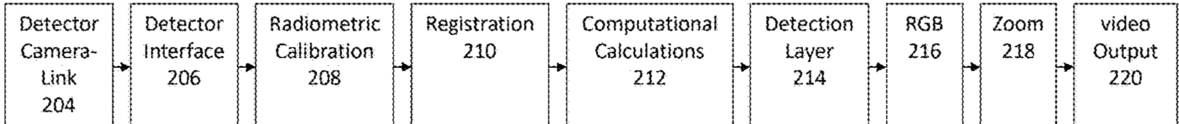
FIG. 2B is a schematic illustration of one possible exemplary design for a real-time multi-spectral system processing chain, in accordance with the presently disclosed subject matter.

Having described an exemplary configuration for the real-time multi-spectral system 100, attention is drawn to FIG. 2B, a schematic illustration of one possible exemplary design for a real-time multi-spectral system processing chain, in accordance with the presently disclosed subject matter.

System 100 utilizes a processing chain to process the input from the multi-spectral sensor's 104 detector to outputting the generated images and/or videos on a video output. It is to be noted, that one or more of the steps of the herein described processing chain can be optional. Some of the steps can be performed in a different order than the order depicted in FIG. 2B.

To support work with more than one filter, for example: when the multi-spectral sensor 104 uses a filter wheel with one or more filters, system 100 utilizes vector multiplexer with different values of registers per each filter of the filter wheel. System 100 can use a generic register block that support inserts of the values that are relevant to corresponding filters, and according to a selector the values read from the vector multiplexer is the one relevant for the corresponding filter.

The processing chain can start with detector camera-link 204 which is an interface to the multi-spectral sensor's 104 detector. The output from the multi-spectral sensor's 104 detector, through the detector camera-link 204, is used as input for the detector interface 206. The detector interface 206 can support 2 modes: (a) regular simple mode (for example: wide SWIR simple mode), for example: at 25 Hz, and (b) cube sampling mode (for example: sample a cube in 1.5 second according to the filter wheel's rotational position—which determines which filter with a given wavelength range will be placed in the imaging path of the sensor to capture an image in that wavelength range). In the simple mode the frames are sampled all the time. In the cube sampling mode, the detector interface samples input frames only when the filter wheel is ready. The information about the filter location (which filter of the filter wheel is currently in front of the detector) can be derived from a mechanism card of the multi-spectral sensor 104. Optionally the information about the filter location can come from software and/or firmware.

Radiometric calibration 208 step includes radiometric correction, Non-Uniformity Correction (NUC) and Bad Pixel Replacement (BPR). Radiometric calibration 208 step supports image integration (summarize of values per pixel of a predefine number of frames) to enable radiometric calculations to be done by processing circuitry 102 (for example: by running given software code). The image integration is determined based on the radiometric correction. This can be done by multiplying the raw spectral data cube by a corresponding radiometric correction matrix. The integration time can depend on the requested filter of the filter wheel. In some cases, system 100 can obtain multiple radiometric correction matrixes. These pre-defined radiometric correction matrixes correspond to given exposure times. System 100 can multiply each channel with a corresponding predetermined radiometric correction matrix in accordance with the exposure time used for that channel. These predefined radiometric correction matrixes can be implemented by system 100 as look-up-tables. System 100 can toggle in real-time between multiple different calibration matrix (for different filters and different integration times). BPR can be performed by using neighboring pixels from a given pixel window around the bad pixel. The BPR can be performed after gain and offset corrections. To support the NUC operation with more than one filter, system 100 utilizes the vector multiplexer, described above, to select the relevant values of gain and offset tables for each input image. The output statistics of the NUC (average and average^2) are collected by sampling the results for the entire spectral data cube. System 100 includes counters for the number of saturated pixels in each filter. This information is used to verify that the integration time is not above a time threshold. Radiometric calibration 208 step can optionally include White Reference Correction (WRC). WRC fixes the spectral data cube images to be reflectance images. This is performed based on the gain and offset corrections.

Registration 210 step includes supporting registration between all sampled images from the one or more filters of the multi-spectral sensor 104 that are used to generate the spectral data cube. To perform the registration between the filter images that build the spectral data cube, system 100 utilizes a Multi-Channel Registration (MCR) algorithm. The MCR algorithm calculates a transformation matrix between pairs of images, even when the gray levels of the pair of images is not the same value or polarity, e.g., when the pair of images have different dynamic range and contrast issues. The registration operation performs the transformation matrix on one of the images, to locate each pair of images on the same scene, pixel by pixel. System 100 can utilize a Video-Formatter module to perform the transformation on the images. The registration process can comprise the following stages: (a) create descriptors for "interest point" on each image, (b) match between descriptors from two images, (c) find the transformation matrix between the two images (in accordance with the location of the "interest points" in each image), and (d) perform the inverse transformation matrix on one of the images. This step can be implemented in software and/or firmware. Stage (a) can use various detection modules, for example: Harris corner detection—which finds the interest points in each of the images, by utilizing filters and the Harris function. If the total results of the function for a specific pixel is bigger than threshold, the pixel selected as interest point. Another example is using MCR descriptors module—a module that builds a descriptor for each interest point, which describe the pixel by all the pixels in an N×N window around pixel. The descriptor includes information about each pixel around the interest point if it's edge, and what is the angle of the edge.

Computational calculations 212 step includes the algorithm that is performed only after the spectral data cube is ready for analysis. If registration is required, the computational calculations 212 step is performed after the registration 210 step has been performed. The processing circuitry 102 can read the relevant parameters of each algorithm from a first designated memory area of system 100, read the spectral data cube, preform the algorithms on the spectral data cube's images and save the results in a second designated memory area of system 100. As the pixels in the edges of the spectral data cube/image can harm the detection abilities of the various algorithms (for example: because the pixels' values on the edges are not correct, duo to: optical effects on the edges of the image, or due to MCR which cause that for some bands the edges are not part of the image), system 100 defines an Area of Interest (AOI) which cuts off the edges of the spectral data cube, and the algorithms calculate only the pixels within this AOI window. The AOI does not influence the size of the spectral data cube and the corresponding detection layers, which are the same as the multi-spectral sensor's 104 detector's resolution. The AOI influences only the algorithmic calculations (for example: mean, covariance, pure algorithms, histograms, and detection decisions, etc.). Optionally, two or more algorithms can be performed on same SLI (SLI is a spectral signature, for example: a vector of twelve values representing the spectral signature of a known material or a known target) and the results can be unified. The detection layer can be a heat-map that informs the probability that each pixel is a target.

The detection algorithms can include one or more of: ratio algorithm, Spectral Angle Mapper (SAM) algorithm, Zero Mean Differential Area (ZDMA) algorithm, Anomaly Detection (AD) algorithm, and Match Filter (MF) algorithm.

The ratio algorithm is based on calculation of ratio between values of the same pixel in different filters (channels). The algorithm supports zero as an input for each of the channels, and also supports the same channel as input for more than one channel.

The SAM algorithm finds the "angle" between the target spectral signature (which is a spectral vector of the signature) and each of the pixels' spectral vector. A spectral vector is a collection of values for each filter, creating a vector of values. The "angle" (further used as "distance") is a vector of value differences.

The ZDMA algorithm is similar to SAM, but finds the ZDMA between the target spectral signature "Fn" and the pixel spectral vector "Ln".

The AD algorithm can use the Reed-Xiaoli (RX) Detector algorithm to detect the spectral differences between a pixel-cube to test and entire dataset. The calculation of the anomaly detection is based on the following stages: (a) calculation of the covariance matrix, (b) calculation of the inverse covariance matrix and (c) calculation of the Anomaly detection equation.

A "detection layer index" can define a detection layer index for a specific algorithm in the total detection layers of the algorithms that are used on the spectral data cube. The index number allows system 100 to set the color value of each algorithm on an output RGB image. For example: if system 100 performs two SAM SLI's and one ratio algorithms on the spectral data cube, the number for each algorithm is set (for example: 0, 1, 2), and then a color value is defined for each of them in the RGB module to give different values for each query. The entire spectral data cube is located in the memory. System 100 can use it to extract SLI of object which exists in the scene. The process of the SLI extraction is calculating the mean gray-level values in a specific area including pixels which are fully covered by the object. The mean value is calculated per each spectral band.

The detection layer 214 step includes the creation of a detection layer to the spectral data cube by adding one or more detection layers to the images. The calculation of the detection layer is based on histogram of each algorithm result from the computational calculations 212 step. The detection layer is generated by system 100 after the algorithm results are ready in computational calculations 212 step. The result of the algorithms indicates if each pixel is a target or not. For many reasons, "holes" can be created in a "big" target, while some pixels are determined as target and some not. This occurs because the detection algorithms used by system 100 have specific threshold settings that limit the pixels that are being counted as part of a target. When setting the thresholds, some pixels in the target area may not pass the threshold and thus be considered as "not part of a target". This creates "holes" in the real area of the target. A blob consolidate algorithm is utilized by system 100 to correct these holes. To correct these holes in the target, system 100 can fuse the marked pixels groups into one target by applying calculations of the target pixel groups. If these pixel groups pass the threshold in windows around the target pixel. If so, all the pixels in the window that pass the threshold can be also marked as part of the target. It is to be noted that the applied calculations can be local average calculations of the target pixels groups—taking into consideration the local average result by the algorithms indicating if these groups of pixels are targets or not. In other cases, the applied calculations can also include spatial calculations, based the contour of the target pixels. The spatial calculations can add neighboring pixels to the target, even if these neighboring pixels were not identified by the algorithm as targets, when they adhere to one or more metrics that are based on spatial and/or spectral properties of these pixels. A non-limiting example can be of pixels that share the same contour as their neighboring target pixels.

The Red Green Blue (RGB) 216 step includes generation of a pseudo RGB image. System 100 selects three images (wavelengths) from the spectral data cube, and set one of them as the RED values of the RGB image, the second as the GREEN values, and the third as the BLUE values of the RGB image. Typically, the GREEN wavelength is selected as the one with high average value, and the RED and BLUE are selected in the two sides of the spectrum relative to the GREEN wavelength with significantly lower average value. The selection of the three images from the spectral data cube can be before registration 210 step or after registration 210 step.

The zoom 218 step is based on a Video Formatter (VF) module. The VF module can work in two modes: gray mode or Y/C image mode. To generate a zoomed image for the "pseudo RGB" image generated in the RGB 216 step, system 100 uses the VF module in Y/C image mode.

The video output 220 step is to output video from system 100 to be viewed on a screen by a human user of system 100. The output is, for example, in High-Definition Serial Digital Interface (HD-SDI) in a rate of 25 Hz. In simple mode, the detector can be synchronized to the HD-SDI output, to prevent cases that part of the output frame is new and part of the frame is old.

Turning to FIG. 3 there is shown a flowchart illustrating an example of a sequence of operations carried out by a real-time multi-spectral system for target detection and further investigation, in accordance with the presently disclosed subject matter.

Accordingly, real-time multi-spectral system 100 can be configured to perform a target identification and investigation process 300, e.g., using the target identification and investigation module 124. The multi-spectral system 100 detects potential targets in real-time and has an additional target investigation capability. System 100 utilizes the multispectral sensor 104 and the additional sensors to detect and investigate potential targets within a given observed area in real-time. System 100 uses multi-spectral sensor 104 to generate the spectral data cube of the given observed area during a time-window and to detect potential targets within the spectral data cube by identifying one or more pixels with a spectral signature that corresponds to one of one or more target spectral signatures. System 100 can simultaneously image the scene with the additional sensors (e.g., the wide daylight sensor 106, the zoom daylight sensor 110, the wide thermal sensor 114, the narrow thermal sensor 118, the narrow SWIR sensor 108, the laser rangefinder 116, etc.) during the time-window. System 100 can grade the identified target areas in the spectral data cube by utilizing an Artificial Intelligence (AI) and/or Machine Learning (ML) Model or by a user of the system manually grading the potential targets. Grading a target is a process in which system 100 scores the final suspected targets for the level of reliability of the element represented by the pixel groups within the scene that have been identified as potential targets. System 100 can use a number of methods to grade the targets, for example: by using logical decision tree, by using the basic grade of the chosen algorithm that was used, by using geometrical dimensions of a typical target of this type and distance, and/or by a combination of the above methods. A non-limiting example is of system 100 generating a new index which combines spectral properties along with spatial and/or statistical behaviors of the target and its surrounding environment. The grading of the target can be associated with: the distance of each of the potential targets from a cursor navigated by a user of the system 100 and/or with the distinctiveness of the identification of the target in the spectral data cube and/or size and behavior of the target and/or the atmospheric correction of the target's pixels. System 100 allows further investigation of the potential targets by utilizing the additional sensors, for example: by taking wide angle images of the potential targets at the given time window, or by zooming-in on the images of the potential targets. It is to be noticed that system 100 can detect multiple potential targets of one or more target types, such as: several potential targets of the same type or several types of targets. This ability is made possible by utilizing a parallel logic design of the detection algorithm. In these algorithms the combination is performed between the spectral and spatial characteristics of the potential targets in order to separate them from the background and reduce the number of false alarms. For every detected target (that passes automatically a set thresholds) a geolocation process is performed in order to transfer the geographic coordinates of the potential targets to the additional sensors of the system 100 for further investigation.

For this purpose, multi-spectral system 100 obtains one or more target spectral signatures (block 302). In continuation of our non-limiting example above, system 100 obtains a target spectral signature that represents the reflectance of a strawberry with respect to the wavelengths that can be captured by multi-spectral sensor 104.

Once the target spectral signatures are obtained, system 100 activates the multi-spectral sensor 104, capable of acquiring images in a plurality of imaging channels, each having a different wavelength range, wherein the multi-spectral sensor 104 is initiated to operate in a wide SWIR simple mode imaging channel (block 304). System 100 can be optionally started with the wide daylight sensor 106 turned-on with a medium zoom and/or with the wide thermal sensor 114 turned-on with a medium zoom and/or with the multi-spectral sensor 114 turned-on with a medium zoom on one of the filters.

The system 100 can optionally switch to using the multi-spectral sensor 104 in the wide SWIR simple mode. System 100 can determine calculated exposure times for each imaging channel of the plurality of imaging channels of the multi-spectral sensor 104 based on the exposure time for the wide SWIR simple mode when viewing a first FOV (block 306). The exposure time determined for the wide SWIR simple mode can be converted by system 100 to the exposure time needed for at least one other imaging channel of the plurality of imaging channels by executing the exposure time determination process, as further detailed herein, inter alia with reference to FIG. 4. System 100 sets the optimal Integration Time (IT) for the "open" (wide spectrum) SWIR detector in the simple mode at full frame rate. By well-known methods of automatic exposure of an image, the selected integration time, sets the multi-spectral channel IT as well as by an empirical pre measured factor. This ensures that the main channel of the multi-spectral sensor 104 will not get saturated. This allows system 100 to utilize the full capacity of the multi-spectral sensor's 104 detector. Yet, some other channels may be under exposed or dark, thus another lookup table is used to set specific IT for each of the channels in order to ensure usage of the dynamic range and optimized Signal to Noise Ratio (SNR) for each of the channels. It is noted that system 100 can determine exposure times for the imaging channels based on a single generated spectral data cube of the first FOV. There is no need for re-capturing of the scene by multi-spectral sensor 104 for determining the exposure times of the imaging channels. The determination of the exposure times can be performed iteratively or periodically by system 100, for example, system 100 can run the exposure time determination process each time system 100 changes the FOV and/or after a threshold time passed after the last time system 100 set the exposure times and/or before a spectral data cube is generated by multi-spectral sensor 104. Another option is that system 100 determines that new exposure times should be calculated by analyzing the captured images.

Following the determination of the calculated exposure times for each of the imaging channels, system 100 can optionally determine, based on an input from a user, atmospheric calibration matrix for the multi-spectral sensor 104 (block 308). In a way of example, a user of system 100 can use controls to move a cursor over an image captured by system 100 and indicate that the pixels corresponding to the location of the cursor are of an object with known reflectivity (for example: indicating that the cursor is on a road, a tree, gravel, etc.). The atmospheric calibration matrix for the multi-spectral sensor 104 can be determined by executing the automatic atmospheric calibration process, as further detailed herein, inter alia with reference to FIG. 5.

After determining the atmospheric calibration matrix, system 100 can be further configured to generate, utilizing the multi-spectral sensor 104, the calculated exposure times and the atmospheric correction matrix, a multi-spectral data cube of a second FOV viewed by the multi-spectral sensor 104, wherein the generation of the multi-spectral data cube includes radiometric calibration and multi-channel registration (block 310). It is to be noted that the second FOV is the area of the scene that system 100 is trying to identify targets within. In some cases, the first FOV and the second FOV are the same. In some cases, the first FOV and the second FOV at least partly overlap and in some cases the first FOV and the second FOV are different—each viewing a different scene. The multi-channel registration can be performed by executing the multi-channel registration process, as further detailed herein, inter alia with reference to FIG. 6. The multi-channel registration process enables system 100 to overcome the challenge of creating a spectral data cube while system 100 and specifically multi-spectral sensor 104 are moving while capturing the spectral data cube. The multi-channel registration process also enables system 100 to geolocate the targets identified using the generated multi-spectral data cube.

Once system 100 generated the multi-spectral data, system 100 can be further configured to identify one or more targets, utilizing the multi-spectral data cube, wherein each target is group of pixels identified within the multi-spectral data cube with a spectral signature that corresponds to at least one of the obtained target spectral signatures and wherein each target has a geolocation (block 312). The groups of pixels can be consolidated into a cluster and the cluster of pixels can be identified as one potential target. This can be done for example by identifying the object's center of mass and marked for the user by encircling the suspected area of the potential target, which is usually adequate for a user of system 100.

The targets can be identified using one or more pre-defined queries that are ran automatically by system 100 on the spectral data cube. The queries can be dynamically defined by an operator of system 100 as the analysis of the spectral data cube is performed. System 100 can create a heatmap of the pixels of the spectral data cube by coloring each pixel to indicate the distance of the pixels spectral vector from the target spectral signature. The targets' thresholds can be automatically changed by system 100. Automatic threshold setting can be performed by system 100 utilizing each of the detection algorithms with its specific range of values. Some of the algorithms—like SAM or ZMDA are limited by specific ranges of values. While other can have very wide range of values. System 100 generates a histogram for the actual values of all pixels in the spectral data cube. Some of the algorithm use minimum or maximum histogram values, based on the fact that the target usually covers only a small portion of the image of the scene, hence the maximum and minimum values of the histogram represent the scene. For other algorithms such as Anomaly detection or Match Filter (MF), where the resulting values can spread on a very wide range—a maximum value derived from the histogram can be neglected. After setting the numerical ranges, system 100 slices the entire range into steps and sets the default initial value for target presentation on the display. The "Blob" algorithm or other combined algorithms (such as: decision trees) can also contribute for the automatic selection of thresholds for the first target display.

One of the challenges in identifying targets within the multi-spectral data cube is fragmentation of the pixel groups. When using histogram-based methods to determine which pixels of the multi-spectral data cube are close enough to the target spectral signature to be considered as potential target pixels, gaps can be created within the area of the target—as some target pixels can be further than the target spectral signature then a given distance threshold. System 100 can utilize one or more cluster fusion algorithms to consolidate the groups of pixels into a cluster identified as a target. The cluster fusion algorithms can be based on local averages of the pixels in the area of the spectral data cube comprising the groups of pixels. Some of these algorithms are based on the assumption that pixels in the area of the target are close to the target spectral signature, even if they are below the given distance threshold. The assumption is used to calculate one or more metrics in the area of the group of clusters to calculate a local average, that is higher than the average of the areas of the spectral data cube not comprising targets. The algorithm can scan the area of the group of clusters to identify a minimum bounding rectangle which bounds an area of pixels having a high local average which represents a smaller distance to the target spectral signature. The center of the bounding rectangle/bounding box is used by system 100 to determine the center of the target. In some cases, the cluster fusion algorithms are iterative algorithms—iteratively searching the area of the groups of pixels for bounding rectangles with an average above an averaged distance threshold from the target spectral signature (i.e., closer to the target spectral signature). Overlapping bounding rectangles are fused together. System 100 can find a minimum bounding rectangle bounding the fused rectangles and generate a bounding box encompassing at least some of the fused rectangles. The bounding box is the identified target.

Continuing our non-limiting example above, a first bounding box comprising one group of pixels can be associated with target spectral signature of a strawberry and identified as a strawberry within the second FOV another group of pixels, comprised within a second bounding box, can be identified as a blueberry within the second FOV. It is to be noted that the spectral data cubes can be stored in data repository 120 using a unique format that stores the identified potential targets as a "layer" in the spectral data cube.

The identified potential targets can be optionally further investigated utilizing one or more additional sensors (block 314). The multi-channel registration of the spectral data cube allows for geolocating of the targets. The geolocation can be used by system 100 to show the potential targets identified on the spectral data cube also on images taken by the additional sensors. Continuing our non-limiting example above, system 100 can show the identified potential strawberry (using its geolocation) on the daylight image. The user can utilize the narrow daylight sensor 110 to zoom in on the identified potential strawberry and determine its visual qualities.

It is to be noted that additionally, or alternately, to at least part of the above-described target identification and investigation process 300, system 100 can perform the detection of one or more target materials directly in an un-calibrated multi-spectral data cube by utilizing a process for detecting one or more target materials in an un-calibrated multi-spectral data cube, as further detailed herein, inter alia with reference to FIG. 9. System 100 can also perform a process for an empirical atmospheric calibration utilizing automatically identified objects within an image of a scene, as further detailed herein, inter alia with reference to FIG. 10. System 100 can also perform a process for determining a registered multi-spectral data cube from one or more two-dimensional images of a scene, as further detailed herein, inter alia with reference to FIG. 11.

It is to be noted, with reference to FIG. 3, that some of the blocks can be integrated into a consolidated block or can be broken down to a few blocks and/or other blocks may be added. It is to be further noted that some of the blocks are optional (for example: blocks 306, 308 and 314). It should be also noted that whilst the flow diagram is described also with reference to the system elements that realizes them, this is by no means binding, and the blocks can be performed by elements other than those described herein.

Figure 4:
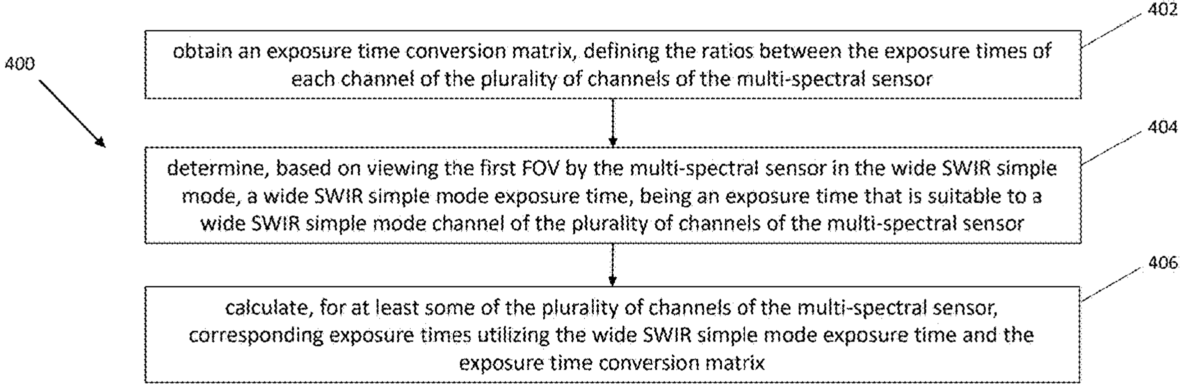
FIG. 4 is a flowchart illustrating an example of a sequence of operations carried out by a real-time multi-spectral system with automatic exposure time calculations, in accordance with the presently disclosed subject matter.

FIG. 4 is a flowchart illustrating an example of a sequence of operations carried out by a real-time multi-spectral system with automatic exposure time calculations, in accordance with the presently disclosed subject matter.

Accordingly, real-time multi-spectral system 100 can be configured to perform an exposure time determination process 400, e.g., using the exposure time determination module 126. The real-time multi-spectral system 100 can have an adaptive real-time radiometric calibration. System 100 can use different exposure times for each of the imaging channels of the multi-spectral sensor 104. The exposure time for each channel is determined in accordance with predefine empiric channel average radiance level by assuming some common Albedo (which means: the measure of diffuse reflection of solar radiation) for each of the channels and the typical expected sun radiance. The system adapts the radiometric calibration done for each channel to the corresponding exposure time by dividing the radiometric value by the adaptive integration time of the channel. In this way the generated spectral data cube has optimal, or at least improved, SNR while keeping radiometric accuracy.

For this purpose, multi-spectral system 100 obtains an exposure time conversion matrix, defining the ratios between the exposure times of each channel of the plurality of channels of the multi-spectral sensor (block 402). For example, the matrix can indicate that a given imaging channel has 4 times the exposure time of the exposure time determined for the wide SWIR simple mode imaging channel.

After obtaining the exposure time conversion matrix, system 100 determines, based on viewing the first FOV by the multi-spectral sensor in the wide SWIR simple mode, a wide SWIR simple mode exposure time, being an exposure time that is suitable to a wide SWIR simple mode channel of the plurality of channels of the multi-spectral sensor (block 406).

System 100 can than calculate, for at least some of the plurality of channels of the multi-spectral sensor, corresponding exposure times utilizing the wide SWIR simple mode exposure time and the exposure time conversion matrix (block 408).

A non-limiting example of an Atmospheric correction process performed by system 100 on each of the multi-spectral data cubes generated by the multi-spectral sensor 104 includes one or more of the following steps: (a) dark image averaging, (b) dark image subtraction, (c) gain matrix re-sampling/averaging, (d) offset matrix re-sampling/averaging, and (e) radiometric calibration. Radiometric calibration is performed by system 100 on one or more pixels of the multi-spectral data cube retrieved by multi-spectral sensor 104 (this is usually being done on all the pixels of the detector or on some of the pixels of the detector, excluding some edge or marginal lines pixels). The radiometric calibration can be performed on the multi-spectral sensor 104, including on a filter wheel of the multi-spectral sensor 104, if any, and/or on one or more of the additional sensors (e.g., the wide daylight sensor 106, the narrow daylight sensor 110, the wide thermal sensor 114, the narrow thermal sensor 118, the narrow SWIR sensor 108, etc.). The radiometric calibration includes additional system's 100 parameters tuning, such as: linearity, non-uniformity and Signal to Noise Ratio (SNR). In order for system 100 to analyze hyperspectral images, the captured multi-spectral data cubes are transformed from gray levels to radiometric values, and later an atmospheric correction enabling eventual transformation to reflectance values. Resulting reflectivity spectra is then analyzed by system 100 and targets can be identified or extracted from the surrounding spectra. Radiometric calibration includes construction of transformation matrixes to radiometric values. Radiation propagating through the system is affected by a number of parameters of the optical transmittance of system's 100 sensors, detector's quantum efficiency (QE) response and dark signal. The first two parameters multiply the signal and contribute to system's 100 gain, and the latter parameter is additive and defines system's 100 offset. Measurement setup can include an integration sphere in front of system's 100 sensor aperture. From measurements performed at a number of signal levels, or alternatively, at a number of integration times, the gain and offset matrices can be calculated. Dark signal is the system's 100 offset. Subtraction of an averaged dark image, can be utilized to cancel out the offset, to be left with a gain matrix. The integration sphere is also calibrated, so its spectro-radiometric values are known to a high degree of precision. A first assumption is that system 100 is linear, and variation of integration time will vary in accordance to the signal. Integration time can be varied, rather than integration sphere light levels, which is limited to a discrete number of levels and may add error to the calibration compared to integration time variations. At every integration time a number of images will be captured by system 100, so as to enable image averaging, thus reducing system's 100 random noise effect. From these measurements system 100 extracts, along with radiometric calibration, SNR levels, system linearity and non-uniformity corrections.

It is to be noted that additionally, or alternately, to at least part of the above-described exposure time determination process 400, system 100 can perform the calibration of the raw multi-spectral data cube by utilizing an automatic calibration based on machine learning models, as further detailed herein, inter alia with reference to FIG. 7.

It is to be noted, with reference to FIG. 4, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

Figure 5:
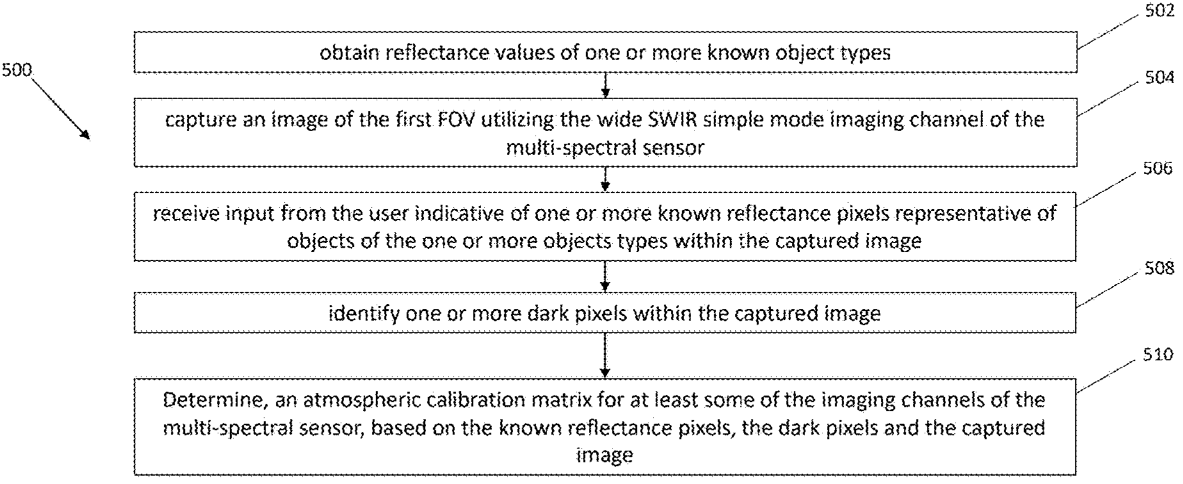
FIG. 5 is a flowchart illustrating an example of a sequence of operations carried out by a real-time multi-spectral system with automatic atmospheric calibration matrix determination, in accordance with the presently disclosed subject matter.

FIG. 5 is a flowchart illustrating an example of a sequence of operations carried out by a real-time multi-spectral system with automatic atmospheric calibration matrix determination, in accordance with the presently disclosed subject matter.

Accordingly, real-time multi-spectral system 100 can be configured to perform an automatic atmospheric calibration process 500, e.g., using the atmospheric calibration module 128. The multi-spectral system 100 has an automatic atmospheric calibration capability. System 100 uses a calibration element within the scene with a known spectral reflectance function. The calibration element can be pointed out by Automatic AI and/or ML identification model or by an operator or a user of system 100 that identifies the calibration element within the scene and classifies the calibration object as one of a number of pre-defined object types (for example: the operator points out an area of the scene that is a paved road). The automatic AI and/or ML identification models can provide an operator of system 100 with a suggestion of the calibration materials by thematic coloring of parts of the scene. In this case, the AI and/or ML model is previously trained using labeled training data to segmentize the entire FOV into a few phenomenological segments. It is up to the operator to approve the suggestion or use the manual interface of selection of calibration material.

The system 100 automatically extracts the Spectro-radiometric path radiance and selection/definition of the calibrating material is done by the operator or by an AI and/or ML algorithm. This process can be controlled by automatic feedback about the quality of the calibration which is shown to the operator on a screen (or by an AI and/or ML model that analyzes the determined colors) as a coloring of the relevant areas of that calibration material. The automatic feedback about the quality of the calibration material can be based on evaluation of selected calibrating materials as a phenomenological segment. The spatial consistency of such segments is calculated by system 100 as the quantitative spectral difference between the pixels that supposedly belong to the same spatial phenomenon in the current FOV. Pixels of the lesser difference are colored in real-time, providing the operator of system 100 with the possibility to visualize on the screen the selected calibrating segment. The AI and/or ML model provides the additional assessment for every determined phenomenon as belonging to the pre-defined classes of calibration materials (e.g., vegetation, roads, soils, rocks) or not. System 100 can determine the atmospheric calibration for the entire spectral data cube or for parts of the spectral data cube. In some cases, a specific target may be enhanced and detected after Atmospheric Correction (ATC) based on specific calibration material. For example, for best detection of some kind or species of vegetation, an atmospheric calibration on that specific vegetation may yield better identification of vegetation rather than calibrate the atmosphere by some soil. In addition, in the AI and/or ML model, direct ATC may yield different results for different scenes, for example: specific targets over specific background at specific range.

In addition, system 100 can be installed on an aerial platform. In some cases, system 100 utilizes diagonal imaging for capturing the scene. System 100 also handles the problem of different ranges to different pixels along the FOV, and/or shaded areas of the scene. In these cases, system 100 can determine the atmospheric calibration for the entire spectral data cube or for parts of the spectral data cube. The partial atmospheric calibration is specifically useful for the spectral scenes that non-uniformly illuminated due to nature of slant imagery. The partition of FOV into the distance ranges, depending on line-of-sight parameters of the current scene is performed directly from the scene, using the water vapor spectral absorption properties and camera model geometry. System 100 automatically preforms the atmospheric calibration of the imaged scene for all the Multispectral channels. In some cases, system 100 can include an AI and/or ML model that can automatically perform atmospheric calibration directly on the spectral data cube. In some cases, system 100 can include an AI and/or ML model that can automatically perform atmospheric calibration directly on the spectral data cube. Thus, an AI neural network is trained with a large dataset of atmospherically corrected imagery and some ground truth (labeled) information from different scenes, in order to build a reliable AI and/or ML model. The resulting trained model is fed into system 100 bands and sensor metadata as inputs, and the output is a corrected reflectance, ready for target detection.

Another option is system 100 identifying targets directly from the radiometric spectral data cube which lack atmospheric correction, using an AI and/or ML model. This AI and/or ML model enables system 100 to directly detect targets in the radiometric spectral data cube, without ATC (Atmospheric Correction). This is performed based on the physical behavior of the atmosphere and the expected relations of path radiance values of the different channels. Trained AI and/or ML model can be previously trained to detect all variations of the radiance spectral signature of targets of interest, using a simulation of all possible illumination conditions. It is to be noted that system 100 can employ the AI and/or ML models on any of its sensors—on the multi-spectral sensor 104 and/or on the additional sensors (e.g., the wide daylight sensor 106, the narrow daylight sensor 110, the wide thermal sensor 114, the narrow thermal sensor 118, the narrow SWIR sensor 108, the laser rangefinder 116, the laser pointer 112, etc.).

For this purpose, multi-spectral system 100 obtains reflectance values of one or more known object types (block 502).

After obtaining the reflectance values of the known object types system 100 captures an image of the first FOV utilizing the wide SWIR simple mode imaging channel of the multi-spectral sensor (block 504).

System 100 can than receive input from the user indicative of one or more known reflectance pixels representative of objects of the one or more objects types within the captured image (block 506).

After receiving the input from the user, system 100 identifies one or more dark pixels within the captured image (block 508).

System 100 can than determine, based on the known reflectance pixels, the dark pixels and the captured image, an atmospheric calibration matrix for at least some of the imaging channels of the multi-spectral sensor (block 510).

It is to be noted, with reference to FIG. 5, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

FIG. 6 is a flowchart illustrating an example of a sequence of operations carried out by a real-time multi-spectral system with multi-channel registration, in accordance with the presently disclosed subject matter.

Accordingly, real-time multi-spectral system 100 can be configured to perform a multi-channel registration process 600, e.g., using the multi-channel registration module 130. The multi-spectral system 100 can eliminate, or at least mitigate, a residual miss-registration of the captured frames that make up the spectral data cube. An MCR algorithm can be used, in order to eliminate spectral mixing and to increase the image stability while collecting the spectral data cube. System 100 selects a reference frame, being an image from one reference imaging channel of the imaging channels of the multi-spectral sensor 104 captured within a given time-frame. System 100 registers all other images from all other imaging channels, other than the reference imaging channel, within the given time-frame to the reference frame. This is achieved in real-time by dividing the computational task between hardware, firmware and software elements of the system in the following manner: Harris corner detection is performed by adaptive threshold matching by Field Programmable Gate Arrays (FPGA) hardware using Sobel definition for the edges and corner matching. A Random Sample Consensus (RANSAC) algorithm is than used iteratively to calculate, test and finally suggest an optimal affine matrix by feedback residual error. In addition, the MCR process is done by finding edges in each image and aligning the edges between the captured images and the reference frame. In one or more of the images, having a contrast difference from the reference frame above a threshold, an inverse image of the one or more of the images is used during the registration process.

For this purpose, multi-spectral system 100 captures a series of images of the second FOV utilizing one or more of the imaging channels of the multi-spectral sensor over a given time-frame (block 602).

After capturing the series of images, system 100 selects a reference frame, being an image from one reference imaging channel of the imaging channels used to capture the series of images within the given time-frame (block 604).

System 100 can than register at least some of the images captured at the given time-frame by other imaging channels, other than the reference imaging channel, to the reference frame (block 606).

It is to be noted, with reference to FIG. 6, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

FIG. 7 is a flowchart illustrating an example of a sequence of operations carried out for automatically generating a calibrated multi-spectral data cube from an un-calibrated multi-spectral data cube, in accordance with the presently disclosed subject matter.

Accordingly, real-time multi-spectral system 100 can be configured to perform a process 700 for automatically generating a calibrated multi-spectral data cube from an un-calibrated multi-spectral data cube, e.g., using the calibrated multi-spectral data cube generation module 132. The multi-spectral system 100 can perform automatic calibration based on AI and/or ML models. The calibrated multi-spectral data cube can be potentially generated from the un-calibrated multi-spectral data cube by a calibration process, such as: an atmospheric calibration process. The atmospheric calibration process can include a tools matching correction, if required.

For this purpose, multi-spectral system 100 can be configured to obtain: (A) a machine learning model capable of receiving the un-calibrated multi-spectral data cube and generating the corresponding calibrated multi-spectral data cube, wherein the machine learning model is trained utilizing a labeled training-data set comprising of a plurality of training records, each training record comprising: (i) a training un-calibrated multi-spectral data cube, and (ii) a training calibrated multi-spectral data cube corresponding to the training un-calibrated multi-spectral data cube, and (B) the un-calibrated multi-spectral data cube (block 702). The obtained un-calibrated multi-spectral data cube can be captured by one or more multi-spectral sensors, such as: multi-spectral sensor 104.

It is to be noted that the machine learning model can be obtained by system 100 from an external source, for example: from a system external to system 100. In other cases, the machine learning model can be at least partially generated and/or trained by system 100 itself. The training data used to train the machine learning model can be obtained by system 100 from an external source, for example from a system external to system 100. In some cases, at least part of the training data used to train the machine learning model can be generated automatically, for example, utilizing the automatic generation of a multi-spectral labeled training-data set process. The training data is labeled-meaning it contains ground truth: pairs of a training calibrated multi-spectral data cube and a training un-calibrated multi-spectral data cube, wherein the training calibrated multi-spectral data cube can be potentially generated from the training un-calibrated multi-spectral data cube by a calibration process.

In some cases, at least one training record of the training records is generated utilizing an atmospheric simulator. The atmospheric simulator capable of receiving a calibrated multi-spectral data cube, one or more atmospheric conditions, and generating an un-calibrated multi-spectral data cube that corresponds to the calibrated multi-spectral data cube under the atmospheric conditions. In these cases, the two or more training records of the training records can include different un-calibrated multi-spectral data cubes generated from the same calibrated multi-spectral data cube under different atmospheric conditions. It is to be noted that the one or more atmospheric conditions include one or more of: moisture levels, sunlight angles, aerosol models, visibility scores, or geographic areas.

After obtaining the machine learning model and the un-calibrated multi-spectral data cube, system 100 can generate the calibrated multi-spectral data cube utilizing the machine learning model and the un-calibrated multi-spectral data cube (block 704).

It is to be noted that at least part of process 700 for automatically generating a calibrated multi-spectral data cube from an un-calibrated multi-spectral data cube can be performed by system 100 by additionally and/or alternatively using a database-based algorithm that searches a database of calibration parameters for calibrating the un-calibrated multi-spectral data cube. This algorithm can include, for example, the following steps: the database is prepared a-priory with a large number of parameters. System 100 searches the database for the best fitted resulting reflectance out of the possibilities in the database. The search can occur per pixel, or macro-pixels of the un-calibrated multi-spectral data cube. An extensive iterative process can be used to build the database of results that are expected to be measured with the acquisition of the un-calibrated multi-spectral data cube by multi-spectral, or hyperspectral sensor (such as: multi-spectral sensor 104). Local parameters, such as: distance, reflectance level, oblique angle, average environmental reflectance level, etc. can be incremented in small steps and iterated in order to predict expected acquired radiance accordingly. Knowing the global parameters, such as: visibility, moisture level, sun azimuth, geographic zone, aerosol model, path radiance, etc. can be a basis for calculation of the abovementioned expected acquired radiance by using an appropriate atmosphere simulator, for example: by using the MODerate resolution atmospheric TRANsmission (MODTRAN) computer code. Each iteration records used speculated values and their results in accordance with expected radiance values as a record in the large database. During operational usage, an estimation of a distance map as well as one or more global atmospheric values can serve to eliminate non relevant records in the database. An efficient search algorithm is utilized to best fit the acquired radiance value per each pixel to the estimated values across the relevant records. Then, an averaging process can be used over the relevant reflectance values in the table in order to estimate the reflectance values and generate the calibrated multi-spectral data cube from an un-calibrated multi-spectral data cube.

It is to be noted, with reference to FIG. 7, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

FIG. 8 is a flowchart illustrating an example of a sequence of operations carried out for automatic generation of a multi-spectral labeled training-data set, in accordance with the presently disclosed subject matter.

Accordingly, real-time multi-spectral system 100 can be configured to perform an automatic generation of a multi-spectral labeled training-data set process 800, e.g., using the multi-spectral labeled training data set generation module 134. The multi-spectral system 100 can automatically generate hyperspectral and/or multi-spectral training data-sets. The hyperspectral and/or multi-spectral labeled training-data set can comprise one or more training records. Each training record comprising a training un-calibrated multi-spectral data cube, and a training calibrated multi-spectral data cube, wherein the training calibrated multi-spectral data cube is generatable from the training un-calibrated multi-spectral data cube by a calibration process.

For this purpose, multi-spectral system 100 can be configured to obtain: (A) a 3D model of a scene, the 3D model having one or more properties (such as: geographical area, sunlight angles, or viewing distance, etc.) and comprising a collection of pixels, wherein at least one pixel of the pixels is associated with: (a) a color, and (b) a label indicative of a material group that an element within the scene associated with the pixel is made of, (B) a material data-base comprising a list of materials, at least one material is associated with: (i) a spectral reflectance signature vector of the material, (ii) a typical color of the material, and (iii) a given material group of the material, and (C) a heuristic table comprising one or more rules, each rule defines a probability of an existence of a given material within a given scene based on the properties of the given scene (block 802). It is noted that in some cases, the calibration process is an atmospheric calibration process.

In some cases, two or more training records of the training records include different un-calibrated multi-spectral data cubes generated from the same calibrated multi-spectral data cube under different atmospheric conditions, such as: moisture levels, sunlight angles, aerosol models, visibility scores, or geographic areas.

After obtaining the 3D model of the scene, the material data-base and the heuristic table, system 100 can capture a two-dimensional (2D) image from the 3D model of the scene, the 2D image comprising a subset of the pixels (block 804).

Utilizing the captured 2D image, system 100 can generate the training calibrated multi-spectral data cube of the training record by doing the following for at least one given pixel of the subset of pixels: query the material data-base for a list of possible materials, being materials having the material group of the given pixel; remove materials from the list of possible materials having a probability below a first threshold to exist in the 2D image in accordance with the rules of the heuristic table and with the properties of the 3D model, giving rise to a redacted list of possible materials; determine a matched material for the given pixel from the redacted list of possible materials based on a match between the color of the given pixel and the typical colors associated with the materials from the redacted list of possible materials; select at least part of the spectral reflectance signature vector associated with the matched material to be part of the training calibrated multi-spectral data cube at the location of the given pixel (block 806).

After generating the training calibrated multi-spectral data cube of the training record, system 100 can generate the training un-calibrated multi-spectral data cube of the training record utilizing the training calibrated multi-spectral data cube and an atmospheric simulator, the atmospheric simulator capable of receiving: (i) the training calibrated multi-spectral data cube, and (ii) one or more atmospheric conditions, and generating the training un-calibrated multi-spectral data cube that corresponds to the training calibrated multi-spectral data cube under the atmospheric conditions (block 808).

It is to be noted, with reference to FIG. 8, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

FIG. 9 is a flowchart illustrating an example of a sequence of operations carried out for detecting one or more target materials in an un-calibrated multi-spectral data cube, in accordance with the presently disclosed subject matter.

Accordingly, real-time multi-spectral system 100 can be configured to perform a detection of one or more target materials in an un-calibrated multi-spectral data cube process 900, e.g., using the target materials detection in un-calibrated multi-spectral data cube module 136. The multi-spectral system 100 can detect various target materials (which are materials that system 100 can be used to identify their existence within the scene) directly from an un-calibrated multi-spectral data cube.

For this purpose, multi-spectral system 100 can be configured to obtain: (A) a machine learning model capable of receiving the un-calibrated multi-spectral data cube and determining for at least one pixel of the pixels at least one material indicator, indicative of existence of a given target material of the target materials at the location of the pixel, wherein the machine learning model is trained utilizing a labeled training-data set comprising of a plurality of training records, each training record comprising: (i) a training un-calibrated multi-spectral data cube, and (ii) at least one training material indicator associated with at least one pixel of the training un-calibrated multi-spectral data cube, indicative of existence of the target material at the location of the pixel, and (B) the un-calibrated multi-spectral data cube (block 902). It is to be noted that the machine learning model can be obtained by system 100 from an external source, for example: from a system external to system 100. In other cases, the machine learning model can be at least partially generated and/or trained by system 100 itself. The training data used to train the machine learning model can be obtained by system 100 from an external source, for example from a system external to system 100. In some cases, at least part of the training data used to train the machine learning model can be generated automatically, for example, utilizing the automatic generation of a multi-spectral labeled training-data set process. The training data is labeled—meaning it contains ground truth: pairs of a training calibrated multi-spectral data cube and a training un-calibrated multi-spectral data cube, wherein the training calibrated multi-spectral data cube can be potentially generated from the training un-calibrated multi-spectral data cube by a calibration process.

After obtaining the machine learning model and the un-calibrated multi-spectral data cube, system 100 can determine for at least one pixel of the pixels of the un-calibrated multi-spectral data cube, at least one material indicator, and a corresponding calibrated multi-spectral data cube, wherein the corresponding calibrated multi-spectral data cube is calculated by utilizing a calibration process and an atmospheric simulator that simulates a plurality of simulated un-calibrated multi-spectral data cubes by simulation of different atmospheric conditions over the calibrated multi-spectral cube (block 904).

It is to be noted, with reference to FIG. 9, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

FIG. 10 is a flowchart illustrating an example of a sequence of operations carried out for empirical atmospheric calibration utilizing automatically identified objects within an image of a scene, in accordance with the presently disclosed subject matter.

Accordingly, real-time multi-spectral system 100 can be configured to perform an empirical atmospheric calibration process 1000 utilizing automatically identified objects within an image of a scene, e.g., using the automatic identification of calibration objects module 138. The multi-spectral system 100 can automatically identify one or more calibration objects within the scene. Calibration objects are objects with known reflectance that can be used to calibrate an un-calibrated multi-spectral data cube.

For this purpose, multi-spectral system 100 can be configured to obtain: (A) a machine learning model capable of receiving the image of the scene and identify the existence of at least one object of the automatically identified objects within the scene, each identified object is associated with: (i) a location within the scene, and (ii) a pre-determined representative reflective spectral signature, and (B) the image of the scene (block 1002). It is to be noted that the machine learning model can be obtained by system 100 from an external source, for example: from a system external to system 100. In other cases, the machine learning model can be at least partially generated and/or trained by system 100 itself. The training data used to train the machine learning model can be obtained by system 100 from an external source, for example from a system external to system 100. In some cases, at least part of the training data used to train the machine learning model can be generated automatically, for example, utilizing the automatic generation of a multi-spectral labeled training-data set process. The training data is labeled—meaning it contains ground truth: pairs of a training calibrated multi-spectral data cube and a training un-calibrated multi-spectral data cube, wherein the training calibrated multi-spectral data cube can be potentially generated from the training un-calibrated multi-spectral data cube by a calibration process.

After obtaining the machine learning model and the image of the scene, system 100 can identify the existence of at least one object of the automatically identified objects within the image of the scene utilizing the machine learning model and the image of the scene (block 1004).

After identifying the existence of at least one object of the automatically identified objects within the image, system 100 can calibrate an un-calibrated multi-spectral data cube associated with the scene utilizing an empirical atmospheric calibration process and based on the location and the pre-determined representative reflective spectral signatures associated with the automatically identified objects (block 1006).

It is to be noted, with reference to FIG. 10, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

FIG. 11 is a flowchart illustrating an example of a sequence of operations carried out for determining a registered multi-spectral data cube from one or more two-dimensional images of a scene, in accordance with the presently disclosed subject matter.

Accordingly, real-time multi-spectral system 100 can be configured to perform a determination of a registered multi-spectral data cube from one or more two-dimensional images of a scene process 1100, e.g., using the registered multi-spectral data cube determination module 140. The multi-spectral system 100 can perform an AI and/or ML based registration. System 10 can determine a registered multi-spectral data cube from one or more 2D images of a scene. At least some of the 2D image acquired at a different wavelength range, wherein at least some of the 2D images are taken from a different viewpoint of the scene, and wherein the registered multi-spectral data cube can be potentially generated from the 2D images by a registration process.

For this purpose, multi-spectral system 100 can be configured to obtain: (A) a machine learning model capable of receiving: (a) a source 2D image of the 2D images of the scene, and (b) a target 2D image of the 2D images of the scene, and determining a corresponding flow map mapping changes to be made to pixels of the source 2D image in order to align the source 2D image with the target 2D image, wherein the machine learning model is trained utilizing a training-data set comprising of a plurality of training records, each training record comprising: (i) a training source 2D image, (ii) a training target 2D image, and (iii) one or more training flow maps mapping changes to be made to pixels of the training source 2D image in order to align the training source 2D image with the training target 2D image, and (B) given 2D images of the scene, each given 2D image having a different wavelength range, wherein each image is taken from a different viewpoint of the scene (block 1102). The training-data set is generated by: obtaining: (A) a three-dimensional (3D) model of a scene, the 3D model having one or more properties and comprising a collection of pixels, wherein at least one pixel of the pixels is associated with: (a) a color, and (b) a label indicative of a material group that an element within the scene associated with the pixel is made of, (B) a material data-base comprising a list of materials, at least one material is associated with: (i) a spectral reflectance signature vector of the material, (ii) a typical color of the material, and (iii) a given material group of the material, and (C) a heuristic table comprising one or more rules, each rule defines a probability of an existence of a given material within a given scene based on the properties of the given scene; capturing at least one 2D image from the 3D model of the scene, each 2D image is captured from a different viewpoint of the scene, each 2D image comprising a subset of the pixels, each training 2D image is associated with a different wavelength range giving rise to the training source 2D image of the given training record; selecting for at least one training source 2D image a training target 2D image of the 2D images captured from the 3D model giving rise to the training target 2D image of the given training record; generate the training flow maps of the given training record by doing the following for at least one given pixel of the subset of pixels of the training source 2D image: query the material data-base for a list of possible materials, being materials having the material group of the given pixel; remove materials from the list of possible materials having a probability below a first threshold to exist in the 2D image in accordance with the rules of the heuristic table and with the properties of the 3D model, giving rise to a redacted list of possible materials; determine a matched material for the given pixel from the redacted list of possible materials based on a match between the color of the given pixel and the typical colors associated with the materials from the redacted list of possible materials; select a corresponding part of the spectral reflectance signature vector associated with the matched material in accordance with the wavelength of the 2D image to be part of the training source 2D image at the location of the given pixel; and generate the training flow maps of the given training record mapping changes to be made to pixels of the source 2D image in order to align the source 2D image with the target 2D image.

It is to be noted that the machine learning model can be obtained by system 100 from an external source, for example: from a system external to system 100. In other cases, the machine learning model can be at least partially generated and/or trained by system 100 itself. The training data used to train the machine learning model can be obtained by system 100 from an external source, for example from a system external to system 100. In some cases, at least part of the training data used to train the machine learning model can be generated automatically, for example, utilizing the automatic generation of a multi-spectral labeled training-data set process. The training data is labeled—meaning it contains ground truth: pairs of a training calibrated multi-spectral data cube and a training un-calibrated multi-spectral data cube, wherein the training calibrated multi-spectral data cube can be potentially generated from the training un-calibrated multi-spectral data cube by a calibration process.

After obtaining the machine learning model and the given 2D images of the scene, system 100 can determine at least one given flow map for at least one given source 2D image of the given 2D images and for at least one given target 2D image of the given 2D images, wherein the given flow map maps changes to be made to pixels of the given source 2D image in order to align the given source 2D image with the given target 2D image, by utilizing the machine learning model on the given source 2D image and the given target 2D image (block 1104).

After determining the given flow map for at least one given source 2D image of the given 2D images and for at least one given target 2D image of the given 2D images, system 100 can generate the registered multi-spectral data cube utilizing the given source 2D images, the corresponding given flow maps, and a remap function (block 1106).

It is to be noted, with reference to FIG. 11, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A multi-spectral potential target identification system, the system comprising:

a multi-spectral sensor capable of acquiring images in a plurality of imaging channels, each having a different wavelength range;

one or more additional sensors;

and a processing circuitry configured to:

obtain one or more target spectral signatures;

activate the multi-spectral sensor, wherein the multi-spectral sensor is initiated to operate in a wide Short Wave Infra-Red (SWIR) simple mode;

determine, based on viewing a first Field Of View (FOV) by the multi-spectral sensor in the wide SWIR simple mode, calculated exposure times for each imaging channel of the plurality of imaging channels of the multi-spectral sensor, wherein the calculated exposure times for each imaging channel of the plurality of imaging channels are determined in accordance with a predefined empiric channel average radiance level by utilizing a common Albedo for each imaging channel of the plurality of imaging channels and a typical expected sun radiance, and wherein a radiometric calibration performed for each given imaging channel of the plurality of imaging channels is adapted to a corresponding exposure time by dividing a radiometric value by an adaptive integration time of the given imaging channel;

determine, based on an input from a user, an atmospheric calibration matrix for the multi-spectral sensor;

generate a multi-spectral data cube of a second FOV viewed by the multi-spectral sensor, utilizing the multi-spectral sensor, the calculated exposure times and the atmospheric calibration matrix, wherein the generation of the multi-spectral data cube includes radiometric calibration and multi-channel registration;

identify, utilizing the multi-spectral data cube, one or more potential targets, wherein each target is group of pixels identified within the multi-spectral data cube with a spectral signature that corresponds to at least one of the obtained target spectral signatures and wherein each target has a geolocation; and investigate one or more of the identified potential targets utilizing the one or more additional sensors.

2. A multi-spectral potential target identification method, the method comprising:

obtaining, by a processing circuitry, one or more target spectral signatures;

activating, by the processing circuitry, a multi-spectral sensor, capable of acquiring images in a plurality of imaging channels, each having a different wavelength range, wherein the multi-spectral sensor is initiated to operate in a wide Short Wave Infra-Red (SWIR) simple mode;

determining, by the processing circuitry, based on viewing a first Field Of View (FOV) by the multi-spectral sensor in the wide SWIR simple mode, calculated exposure times for each imaging channel of the plurality of imaging channels of the multi-spectral sensor, wherein the calculated exposure times for each imaging channel of the plurality of imaging channels are determined in accordance with a predefined empiric channel average radiance level by utilizing a common Albedo for each imaging channel of the plurality of imaging channels and a typical expected sun radiance, and wherein a radiometric calibration performed for each given imaging channel of the plurality of imaging channels is adapted to a corresponding exposure time by dividing a radiometric value by an adaptive integration time of the given imaging channel;

determining, by the processing circuitry, based on an input from a user, an atmospheric calibration matrix for the multi-spectral sensor;

generating, by the processing circuitry, a multi-spectral data cube of a second FOV viewed by the multi-spectral sensor, utilizing the multi-spectral sensor, the calculated exposure times and the atmospheric calibration matrix, wherein the generation of the multi-spectral data cube includes radiometric calibration and multi-channel registration;

identifying, by the processing circuitry, utilizing the multi-spectral data cube, one or more potential targets, wherein each target is group of pixels identified within the multi-spectral data cube with a spectral signature that corresponds to at least one of the obtained target spectral signatures and wherein each target has a geolocation; and investigating, by the processing circuitry, one or more of the identified potential targets utilizing one or more additional sensors.

3. A non-transitory computer readable storage medium having computer readable program code embodied therewith, the computer readable program code, executable by at least one processing circuitry of a computer to perform a method comprising:

obtaining, by a processing circuitry, one or more target spectral signatures;

activating, by the processing circuitry, a multi-spectral sensor, capable of acquiring images in a plurality of imaging channels, each having a different wavelength range, wherein the multi-spectral sensor is initiated to operate in a wide Short Wave Infra-Red (SWIR) simple mode;

determining, by the processing circuitry, based on viewing a first Field Of View (FOV) by the multi-spectral sensor in the wide SWIR simple mode, calculated exposure times for each imaging channel of the plurality of imaging channels of the multi-spectral sensor, wherein the calculated exposure times for each imaging channel of the plurality of imaging channels are determined in accordance with a predefined empiric channel average radiance level by utilizing a common Albedo for each imaging channel of the plurality of imaging channels and a typical expected sun radiance, and wherein a radiometric calibration performed for each given imaging channel of the plurality of imaging channels is adapted to a corresponding exposure time by dividing a radiometric value by an adaptive integration time of the given imaging channel;

determining, by the processing circuitry, based on an input from a user, an atmospheric calibration matrix for the multi-spectral sensor;

generating, by the processing circuitry, a multi-spectral data cube of a second FOV viewed by the multi-spectral sensor, utilizing the multi-spectral sensor, the calculated exposure times and the atmospheric calibration matrix, wherein the generation of the multi-spectral data cube includes radiometric calibration and multi-channel registration;

identifying, by the processing circuitry, utilizing the multi-spectral data cube, one or more potential targets, wherein each target is group of pixels identified within the multi-spectral data cube with a spectral signature that corresponds to at least one of the obtained target spectral signatures and wherein each target has a geo-location; and investigating, by the processing circuitry, one or more of the identified potential targets utilizing one or more additional sensors.

* * * * *